(12) United States Patent
Oodachi et al.

(10) Patent No.: US 10,658,876 B2
(45) Date of Patent: May 19, 2020

(54) POWER TRANSMISSION DEVICE, POWER RECEPTION DEVICE, AND POWER TRANSMISSION SYSTEM

(71) Applicant: KABUSHIKI KAISHA TOSHIBA, Tokyo (JP)

(72) Inventors: Noriaki Oodachi, Kanagawa (JP); Shuichi Obayashi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 214 days.

(21) Appl. No.: 15/269,174

(22) Filed: Sep. 19, 2016

(65) Prior Publication Data

US 2017/0005528 A1    Jan. 5, 2017

Related U.S. Application Data

(63) Continuation of application No. PCT/JP2014/065620, filed on Jun. 12, 2014.

(51) Int. Cl.
*H01F 27/42* (2006.01)
*H01F 37/00* (2006.01)
(Continued)

(52) U.S. Cl.
CPC .............. *H02J 50/40* (2016.02); *H02J 50/12* (2016.02); *H02J 50/20* (2016.02); *H02J 5/005* (2013.01); *H02J 50/70* (2016.02)

(58) Field of Classification Search
CPC .. H02J 50/40; H02J 50/20; H02J 50/12; H02J 50/90; H02J 50/70; H02J 17/00; H02J 5/005; H02J 17/005
See application file for complete search history.

(56) References Cited

U.S. PATENT DOCUMENTS

2008/0227478 A1* 9/2008 Greene .............. G06K 19/0701
455/522
2012/0086281 A1* 4/2012 Kanno .................... H02J 5/005
307/82

(Continued)

FOREIGN PATENT DOCUMENTS

EP       2 579 522         4/2013
EP       2579522 A1 *      4/2013   .............. H02J 7/025
(Continued)

OTHER PUBLICATIONS

International Preliminary Report on Patentability dated Dec. 22, 2016, issued by The International Bureau of WIPO in International Application No. PCT/JP2014/065620; 2 pages.
(Continued)

*Primary Examiner* — Rexford N Barnie
*Assistant Examiner* — Rasem Mourad
(74) *Attorney, Agent, or Firm* — Finnegan, Henderson, Farabow, Garrett & Dunner, L.L.P.

(57) ABSTRACT

A power transmission device according to one embodiment, includes a first power transmission resonator configured to wirelessly transmits power; a second power transmission resonator configured to wirelessly transmits power; a first power supply configured to output AC power to the first power transmission resonator; and a second power supply configured to output AC power having a frequency different from that of the first power supply to the second power transmission resonator. An operating band of the first power transmission resonator includes the frequency of the first power supply and does not include the frequency of the second power supply. An operating band of the second power transmission resonator does not include the frequency of the first power supply and includes the frequency of the second power supply.

10 Claims, 17 Drawing Sheets

(51) Int. Cl.
  *H01F 38/00* (2006.01)
  *H02J 50/40* (2016.01)
  *H02J 50/20* (2016.01)
  *H02J 50/12* (2016.01)
  *H02J 5/00* (2016.01)
  *H02J 50/70* (2016.01)

(56) References Cited

U.S. PATENT DOCUMENTS

| | | | | |
|---|---|---|---|---|
| 2012/0169139 A1* | 7/2012 | Kudo | ................ | H02J 5/005 |
| | | | | 307/104 |
| 2012/0217818 A1* | 8/2012 | Yerazunis | ............ | H02J 5/005 |
| | | | | 307/104 |
| 2013/0162054 A1* | 6/2013 | Komiyama | ........... | H02J 50/80 |
| | | | | 307/149 |
| 2014/0159501 A1* | 6/2014 | Kanno | .................. | H01F 38/14 |
| | | | | 307/104 |
| 2015/0077046 A1* | 3/2015 | Huang | ................. | B60L 11/182 |
| | | | | 320/108 |
| 2016/0322868 A1* | 11/2016 | Akuzawa | ............... | H02J 17/00 |
| 2017/0163093 A1* | 6/2017 | Akuzawa | ............... | H02J 50/12 |

FOREIGN PATENT DOCUMENTS

| | | |
|---|---|---|
| JP | 2011-199975 | 10/2011 |
| JP | 2011199975 A * | 10/2011 |
| JP | 2012-039815 | 2/2012 |
| JP | 2013-085246 | 5/2013 |
| JP | 2013-132133 | 7/2013 |
| WO | WO-2015/037690 | 3/2015 |

OTHER PUBLICATIONS

Written Opinion dated Jul. 15, 2014, issued by Japanese Patent Office in International Application No. PCT/JP2014/065620; 6 pages.

International Search Report from the Japanese Patent Office, dated Jul. 15, 2014 for PCT Application No. PCT/JP2014/065620.

* cited by examiner

POWER TRANSMISSION DEVICE, POWER RECEPTION DEVICE, AND POWER TRANSMISSION SYSTEM

CROSS REFERENCE TO RELATED APPLICATION

This application is a Continuation of International Application No. PCT/JP2014/065620, filed on Jun. 12, 2014, the entire contents of which is hereby incorporated by reference.

FIELD

Embodiments described herein relate to a power transmission device, a power reception device, and a power transmission system.

BACKGROUND

Conventionally, as a technique of enabling power transmission in a contactless manner, there has been known an electromagnetic induction system in which current is passed through one of two adjacent coils, energy is converted into a magnetic field, and then electromotive force is generated in the other coil. Further, as another method, there has been known a radio wave system in which current is converted into an electromagnetic wave, and energy is transmitted via an antenna. The former is suitable for a case where large power is handled, but, a power transmission distance thereof is generally short. The latter has a long power transmission distance, but, control of a transmission direction is difficult and thus a transmission efficiency is low.

On the contrary, there has been known a magnetic field resonance system in which a power transmission resonator is disposed in a power transmission device, a power reception resonator is disposed in a power reception device, and the resonators are coupled to each other by magnetic field resonance. According to the magnetic field resonance system, there are characteristics such that it is possible to obtain a high transmission efficiency even if there is a certain amount of separation distance, and there is little influence due to axis deviation and the like.

When power transmission is performed by using a plurality of power transmission resonators in this magnetic field resonance system, there is a possibility that the plurality of power transmission resonators are mutually magnetic-field-coupled, resulting in that power is transmitted from a certain power transmission resonator to another power transmission resonator. This lowers a transmission efficiency, which is a problem.

DETAILED DESCRIPTION

Figure 1:
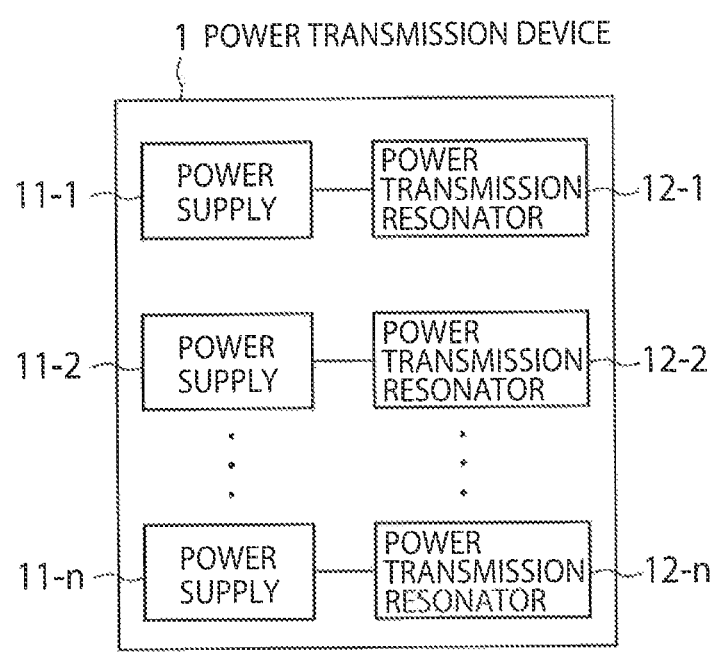
FIG. 1 is a diagram illustrating a configuration of a power transmission device 1 in a first embodiment.

A problem to be solved by embodiments described herein is to provide a power transmission device improving a transmission efficiency when performing wireless power transmission by using a plurality of power transmission resonators, a power reception device, and a power transmission system.

A power transmission device according to one embodiment, includes a first power transmission resonator configured to wirelessly transmits power; a second power transmission resonator configured to wirelessly transmits power; a first power supply configured to output AC power to the first power transmission resonator; and a second power supply configured to output AC power having a frequency different from that of the first power supply to the second power transmission resonator. An operating band of the first power transmission resonator includes the frequency of the first power supply and does not include the frequency of the second power supply. An operating band of the second power transmission resonator does not include the frequency of the first power supply and includes the frequency of the second power supply.

Hereinafter, embodiments of the present invention will be described while referring to the drawings.

First Embodiment

FIG. 1 is a diagram illustrating a configuration of a power transmission device 1 in a first embodiment. The power transmission device 1 employs a magnetic field resonance system, and transmits power to a not-illustrated power reception device in a contactless manner. As illustrated in FIG. 1, the power transmission device 1 includes n power supplies 11-$i$ of power supplies 11-1, 11-2, ..., up to 11-$n$ (n is a positive integer), and n power transmission resonators 12-$i$ of power transmission resonators 12-1, 12-2, ..., up to 12-$n$.

Outputs of the respective power supplies 11-$i$ are connected to the power transmission resonators 12-$i$ with the same index i. The respective power supplies 11-$i$ output AC powers having mutually different frequencies, and supply the powers to the power transmission resonators 12-$i$ with the same index i.

The power transmission resonators 12-1, 12-2, ..., 12-$n$ are connected to different ones of the plurality of power supplies 11-1, 11-2, ..., 11-$n$, and have mutually different resonance frequencies.

In the present embodiment, description will be made hereinafter by assuming that the resonance frequencies of the respective power transmission resonators 12-$i$ are equal to frequencies of the power supplies 11-$i$ to which the power transmission resonators are connected, as an example.

Figure 2:
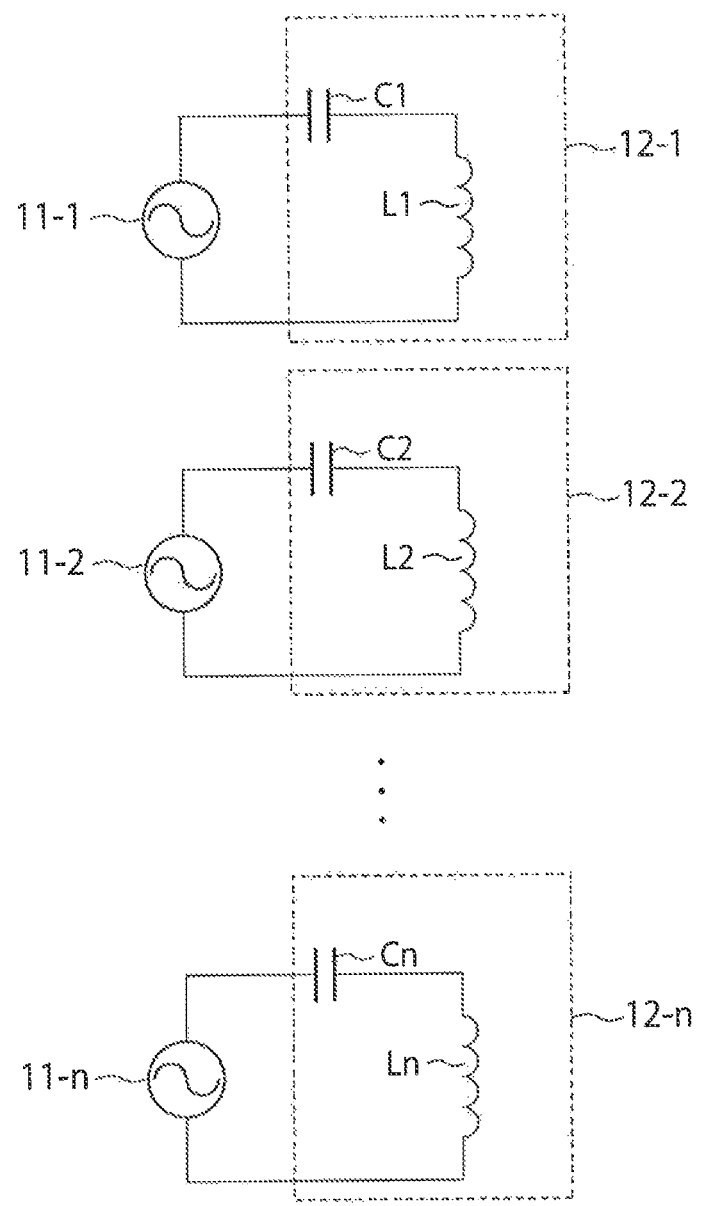
FIG. 2 is a diagram illustrating one example of equivalent circuit of the power transmission device 1 in the first embodiment.

FIG. 2 is a diagram illustrating one example of equivalent circuit of the power transmission device 1 in the first embodiment. As illustrated in FIG. 2, each of the power transmission resonators 12-$i$ includes a capacitor Ci having one end connected to one end of the power supply 11-$i$, and an inductor Li having one end connected to the other end of the capacitor Ci, and the other end connected to the other end of the power supply 11-$i$.

Figure 3:
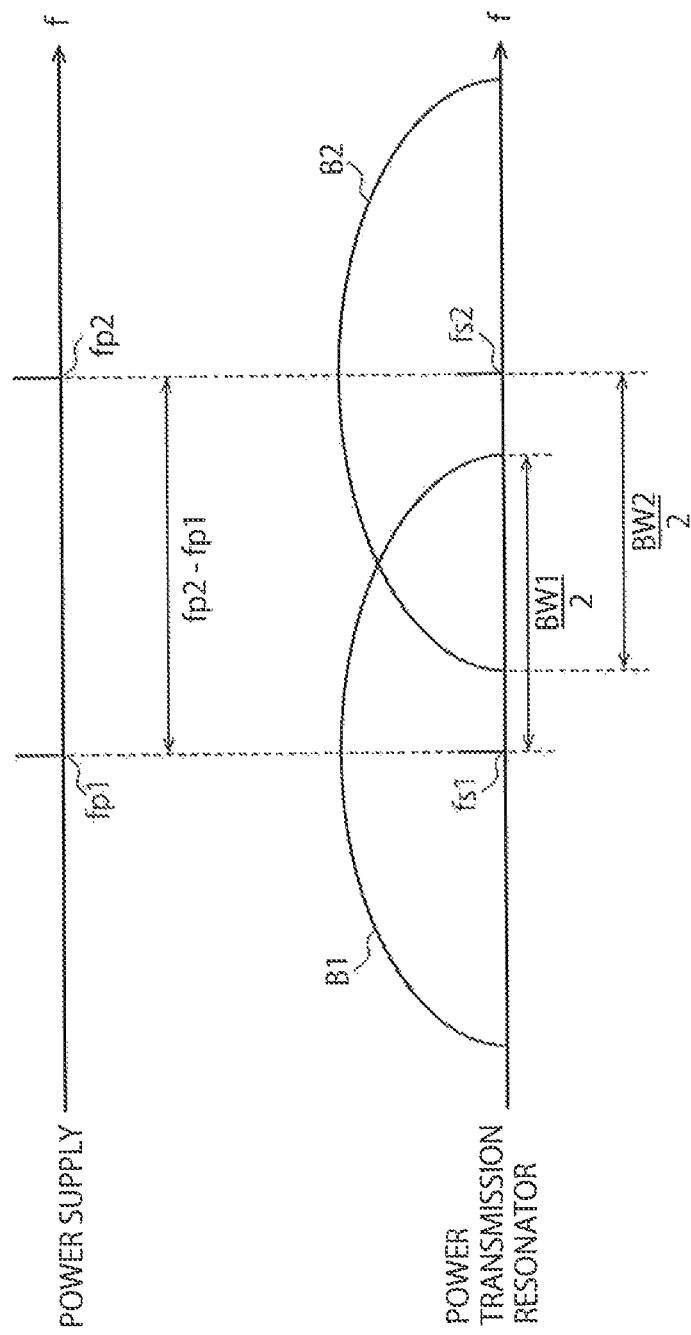
FIG. 3 is a diagram illustrating a first example of relation between operating bands of power transmission resonators whose resonance frequencies are adjacent to each other on a frequency axis, and frequencies of power supplies connected to these power transmission resonators.

Next, relation between operating bands of the power transmission resonators and frequencies of the respective power supplies 11-$i$ in the present embodiment will be described by using FIG. 3. FIG. 3 is a diagram illustrating a first example of relation between operating bands of power transmission resonators whose resonance frequencies are adjacent to each other on a frequency axis, and frequencies of power supplies connected to these power transmission resonators.

Here, out of the plurality of power transmission resonators, power transmission resonators whose resonance frequencies are adjacent to each other on the frequency axis are set to a first power transmission resonator and a second power transmission resonator. Further, the resonance frequency of the first power transmission resonator is set to fs1, and the resonance frequency of the second power transmission resonator is set to fs2.

A power supply connected to the first power transmission resonator is set to a first power supply, and a power supply connected to the second power transmission resonator is set to a second power supply. Here, a frequency of AC power output by the first power supply (referred to as a frequency of the first power supply, hereinafter) is set to fp1, and a frequency of AC power output by the second power supply (referred to as a frequency of the second power supply, hereinafter) is set to fp2.

Further, as an example, it is set that all pairs each consisting of the first power transmission resonator and the second power transmission resonator satisfy the following frequency difference condition. As illustrated in FIG. 3, a difference between the frequency fp1 of the first power supply and the frequency fp2 of the second power supply (fp2−fp1) is greater than one-half an operating bandwidth BW1 of the first power transmission resonator, and is greater than one-half an operating bandwidth BW2 of the second power transmission resonator.

When the frequency difference condition is satisfied, the frequency fp2 of the second power supply is out of the operating band of the first power transmission resonator. Specifically, at the frequency fp2 of the second power supply, the first power transmission resonator is not magnetic-field-coupled to the second power transmission resonator which resonates at the frequency fp2 of the second power supply. In a similar manner, the frequency fp1 of the first power supply is out of the operating band of the second power transmission resonator. Specifically, at the frequency fp1 of the first power supply, the second power transmission resonator is not magnetic-field-coupled to the second power transmission resonator which resonates at the frequency fp1 of the first power supply.

Therefore, in all of the pairs each consisting of the first power transmission resonator and the second power transmission resonator satisfying this condition, the magnetic-field-coupling does not occur at the frequency fp1 of the first power supply and the frequency fp2 of the second power supply. For this reason, when performing wireless power transmission to a plurality of power reception resonators using the magnetic field resonance system, the transmission efficiency with respect to a power reception device can be improved.

Here, the operating bandwidth BW1 of the first power transmission resonator is expressed by fs1/Q1, which is a value as a result of dividing the resonance frequency fs1 of the first power transmission resonator by a Q value Q1 of the first power transmission resonator. Further, the operating bandwidth BW2 of the second power transmission resonator is expressed by fs2/Q2, which is a value as a result of dividing the resonance frequency fs2 of the second power transmission resonator by a Q value Q2 of the second power transmission resonator. Accordingly, the operating bandwidths of the power transmission resonators are previously set by using the resonance frequencies and the Q values of the power transmission resonators.

Note that the Q value of the power transmission resonator can be calculated by $\omega_0 L/R$. Here, $\omega_0$ indicates a resonance angular frequency, L indicates inductance of the power transmission resonator, and R indicates a resistance value of the power transmission resonator. When $\pi$ is set to a circle ratio, and f is set to a resonance frequency, the resonance angular frequency $\omega_0$ is represented by $2\pi f$. The inductance value L and the resistance value R of the power transmission resonator can be measured, and thus it is possible to determine the Q value of the power transmission resonator.

(Effect of First Embodiment)

With this configuration, since the magnetic-field-coupling does not occur between the power transmission resonators at the frequency fp1 of the first power supply and the frequency fp2 of the second power supply, when the wireless power transmission to the plurality of power reception resonators is performed using the magnetic field resonance system, the transmission efficiency with respect to the power reception device can be improved.

Further, in the present embodiment, each of the power transmission resonators 12-$i$ is connected to the output of one of the power supplies 11-$i$, and thus the outputs of the plurality of power supplies 11-$i$ do not concentrate on one power transmission resonator. For this reason, heat generation of the power transmission resonators can be suppressed, resulting in that an amount of temperature rise of the power transmission resonators is reduced.

Note that in the present embodiment, it is set that all pairs each consisting of the first power transmission resonator and the second power transmission resonator satisfy the aforementioned frequency difference condition, but, it is also possible to set that at least one pair consisting of the first power transmission resonator and the second power transmission resonator satisfies the aforementioned frequency difference condition.

Note that in the present embodiment, the description is made by assuming that the resonance frequencies of the respective power transmission resonators 12-$i$ are equal to the frequencies of the power supplies with the same index i, namely, the power supplies 11-$i$ to which the power transmission resonators are connected, but, the present embodiment is not limited to this. There is also a case where the resonance frequencies of the respective power transmission resonators 12-$i$ are different from the frequencies of the power supplies with the same index i, namely, the power supplies 11-$i$ to which the power transmission resonators are connected. Operating bands of the power transmission resonators whose resonance frequencies are adjacent to each other on the frequency axis, in such a case, will be described by using FIG. 4.

Figure 4:
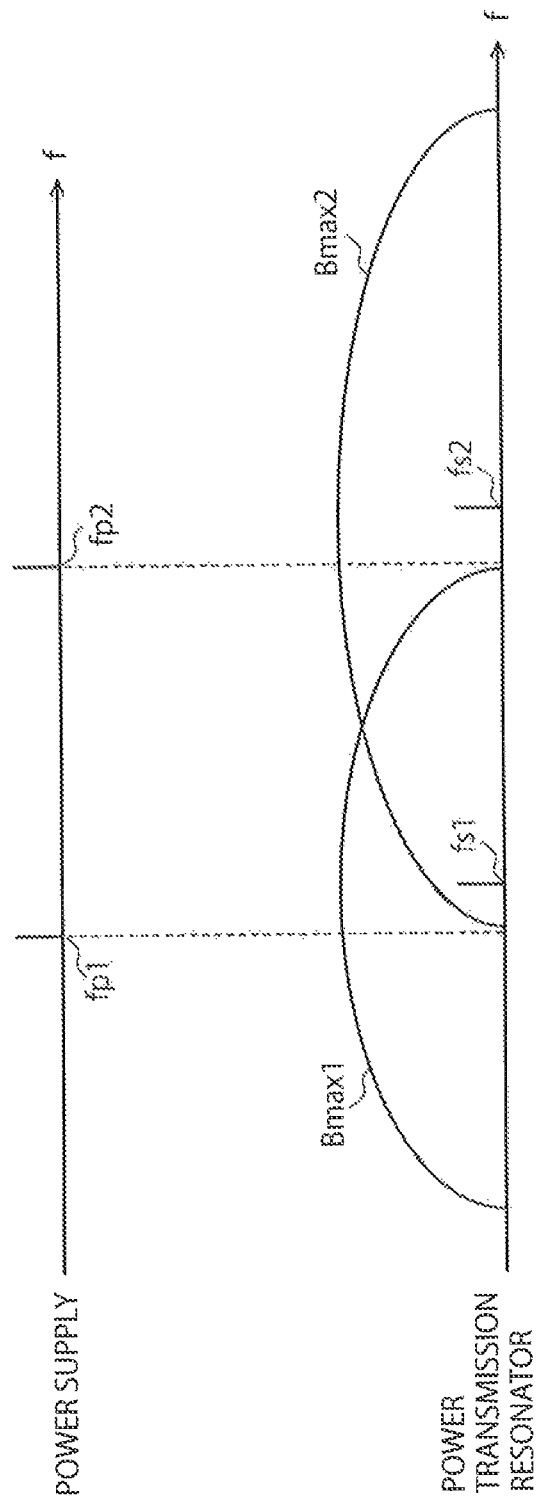
FIG. 4 is a diagram illustrating a second example of relation between operating bands of power transmission resonators whose resonance frequencies are adjacent to each other on the frequency axis, and frequencies of power supplies connected to these power transmission resonators.

FIG. 4 is a diagram illustrating a second example of relation between operating bands of the power transmission resonators whose resonance frequencies are adjacent to each other on the frequency axis, and frequencies of the power supplies connected to these power transmission resonators. As illustrated in FIG. 4, the resonance frequency fs1 of the first power transmission resonator is different from the frequency fp1 of the first power supply connected to the first power transmission resonator. The resonance frequency fs2 of the second power transmission resonator is different from the frequency fp2 of the second power supply connected to the second power transmission resonator.

Here, in a similar manner to FIG. 3, the power transmission resonators whose resonance frequencies are adjacent to each other on the frequency axis, out of the plurality of power transmission resonators 12-1 to 12-$n$, are defined as the first power transmission resonator and the second power transmission resonator. Further, as an example, it is set that all pairs each consisting of the first power transmission resonator and the second power transmission resonator satisfy the following operating band condition.

As indicated by a maximum band Bmax1 capable of being obtained by the first power transmission resonator in FIG. 4, the operating band of the first power transmission resonator includes the frequency fp1 of the first power supply, and does not include the frequency fp2 of the second power supply. Further, as indicated by a maximum band Bmax2 capable of being obtained by the second power transmission resonator in FIG. 4, the operating band of the second power transmission resonator does not include the frequency fp1 of the first power supply, and includes the frequency fp2 of the second power supply.

Accordingly, in all of the pairs each consisting of the first power transmission resonator and the second power transmission resonator satisfying this condition, the magnetic-field-coupling does not occur at the frequency fp1 of the first power supply and the frequency fp2 of the second power supply. For this reason, when performing the wireless power transmission to the plurality of power reception resonators using the magnetic field resonance system, the transmission efficiency with respect to the power reception device can be improved.

Note that although it is set that all of the pairs each consisting of the first power transmission resonator and the second power transmission resonator satisfy the aforementioned operating band condition, the present embodiment is not limited to this. It is also possible to set that at least one or more pairs each consisting of the first power transmission resonator and the second power transmission resonator satisfy the aforementioned operating band condition. Accordingly, the magnetic-field-coupling does not occur between the first power transmission resonator and the second power transmission resonator satisfying the operating band condition at the frequency fp1 of the first power supply and the frequency fp2 of the second power supply. For this reason, when performing the wireless power transmission to the plurality of power reception resonators using the magnetic field resonance system, the transmission efficiency with respect to the power reception device can be improved.

Second Embodiment

Figure 5:
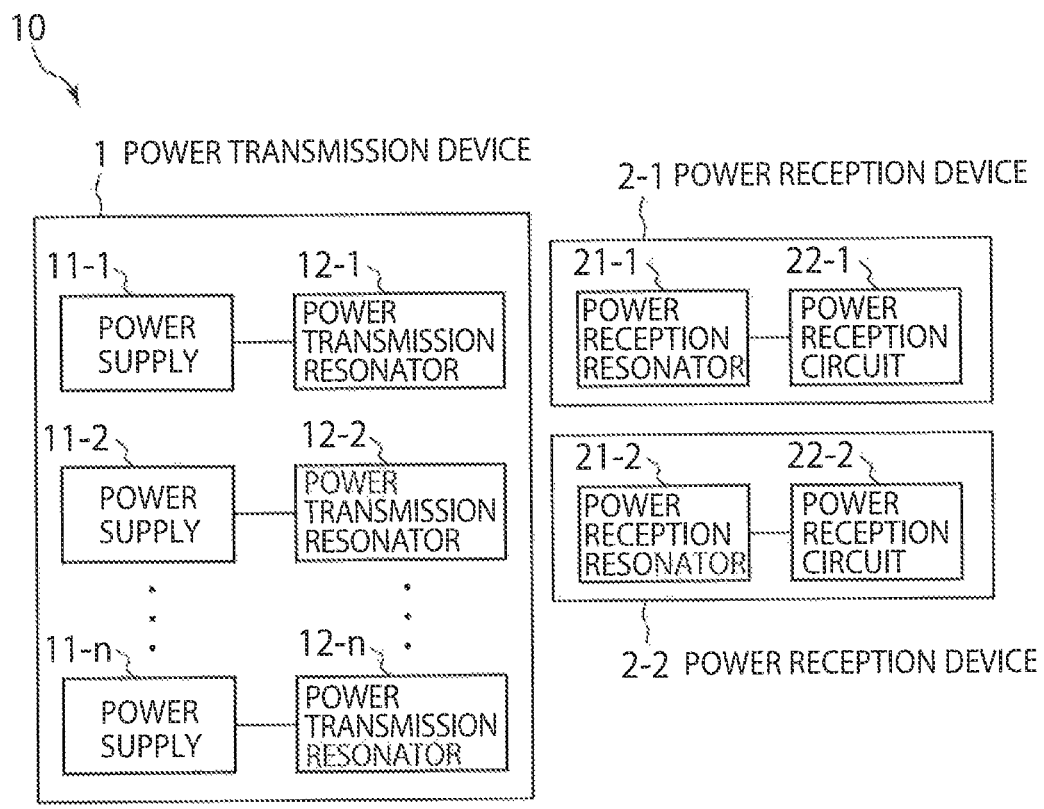
FIG. 5 is a diagram illustrating a configuration of a power transmission system 10 in a second embodiment.

Next, a second embodiment will be described. FIG. 5 is a diagram illustrating a configuration of a power transmission system 10 in the second embodiment. The power transmission system 10 includes the power transmission device 1, a power reception device 2-1, and a power reception device 2-2. Note that elements common to those in FIG. 1 are denoted by the same reference signs, and concrete description thereof will be omitted. The configuration of the power transmission device 1 in FIG. 5 is the same as the configuration of the power transmission device 1 in FIG. 1, so that explanation thereof will be omitted.

The power reception device 2-1 includes a power reception resonator 21-1, and a power reception circuit 22-1 connected to the power reception resonator 21-1. The power reception device 2-1 is disposed so that the power transmission resonator 12-1 and the power reception resonator 21-1 face each other. Further, an operating band of the power reception resonator 21-1 includes the frequency of the power supply 11-1. Consequently, the power reception resonator 21-1 can wirelessly receive power from the power transmission resonator 12-1 through the magnetic field resonance.

In the present embodiment, as an example, the power reception resonator 21-1 has a resonance frequency which is the same as the frequency of the power supply 11-1 to which the power transmission resonator 12-1, disposed to face the power reception resonator 21-1, is connected. Besides, the power reception resonator 21-1 and the power transmission resonator 12-1 disposed to face the power reception resonator 21-1, have the matched resonance frequency. Consequently, the resonators can be resonated at the same resonance frequency, which enables to improve the transmission efficiency.

The power reception circuit 22-1 is a circuit which stores power supplied from the power reception resonator 21-1 or operates an electronic circuit using the supplied power, and is formed of an arbitrary electronic circuit. The power reception circuit 22-1 is a load, for example. Hereinafter, it is assumed that the power reception circuit in each of the embodiments is formed of an arbitrary electronic circuit.

In a similar manner, the power reception device 2-2 includes a power reception resonator 21-2, and a power reception circuit 22-2 connected to the power reception resonator 21-2. The power reception device 2-2 is disposed so that the power transmission resonator 12-2 and the power reception resonator 21-2 face each other. Further, an operating band of the power reception resonator 21-2 includes the frequency of the power supply 11-2. Consequently, the power reception resonator 21-2 can wirelessly receive power from the power transmission resonator 12-2 through the magnetic field resonance.

In the present embodiment, as an example, the power reception resonator 21-2 has a resonance frequency which is the same as the frequency of the power supply 11-2 to which the power transmission resonator 12-2, disposed to face the power reception resonator 21-2, is connected. Besides, the power reception resonator 21-2 and the power transmission resonator 12-2 disposed to face the power reception resonator 21-2, have the matched resonance frequency. Consequently, the resonators can be resonated at the same resonance frequency, which enables to improve the transmission efficiency.

The power reception circuit 22-2 receives power supplied from the power reception resonator 21-2. The power reception circuit 22-2 is a load, for example.

Figure 6:
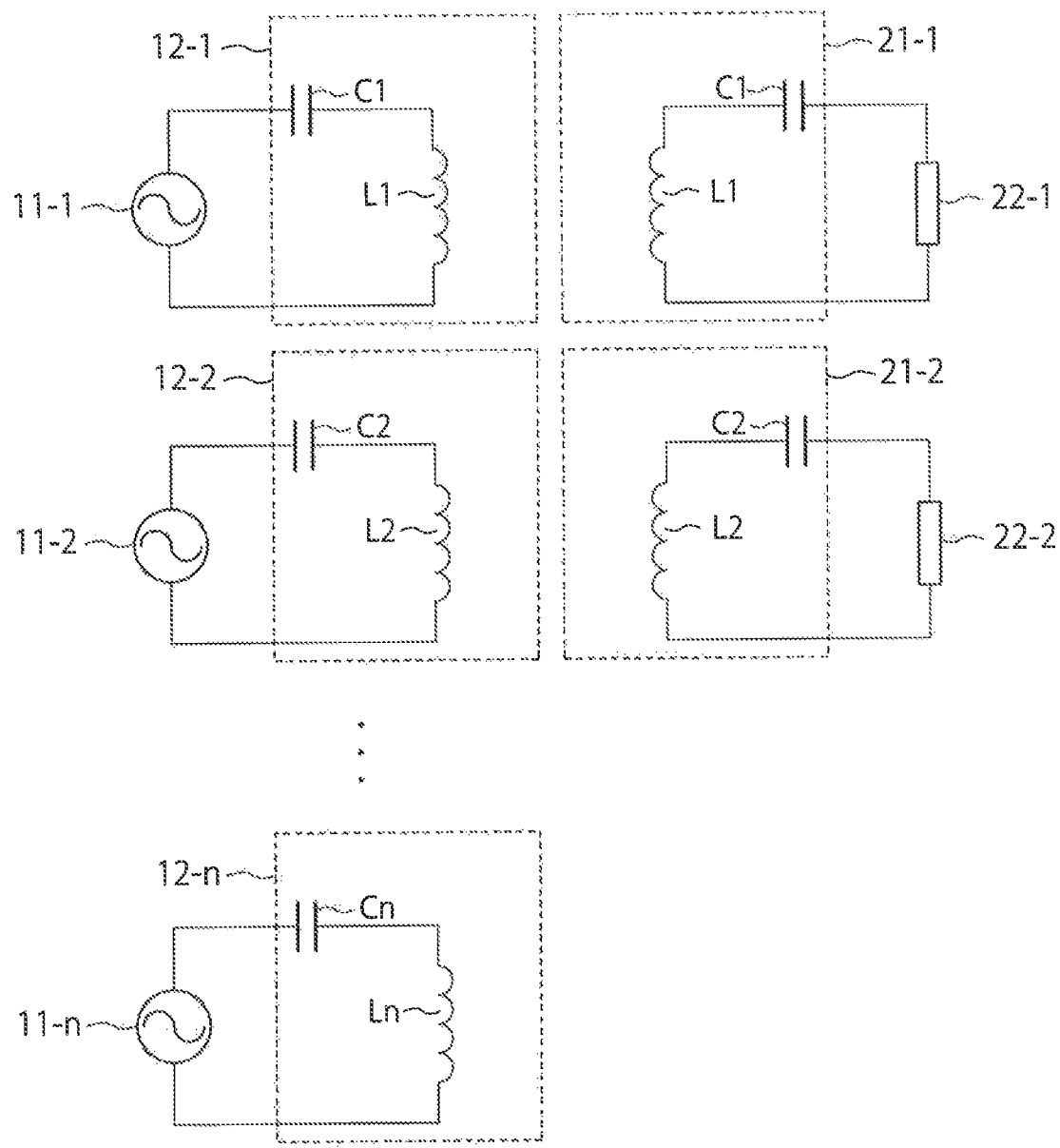
FIG. 6 is a diagram illustrating one example of equivalent circuit of the power transmission system 10 in the second embodiment.

FIG. 6 is a diagram illustrating one example of equivalent circuit of the power transmission system 10 in the second embodiment. As illustrated in FIG. 6, each of the power transmission resonators 12-$i$ includes the capacitor Ci having one end connected to one end of the power supply 11-$i$, and the inductor Li having one end connected to the other end of the capacitor Ci, and the other end connected to the other end of the power supply 11-$i$.

Further, as illustrated in FIG. 6, the power reception resonator 21-1 includes a capacitor C1 having one end connected to one end of an inductor L1, and the other end connected to one end of the power reception circuit 22-1, and the inductor L1 having the other end connected to the other end of the power reception circuit 22-1.

Further, as illustrated in FIG. 6, the power reception resonator 21-2 includes a capacitor C2 having one end connected to one end of an inductor L2, and the other end connected to one end of the power reception circuit 22-2, and the inductor L2 having the other end connected to the other end of the power reception circuit 22-2.

Note that in the present embodiment, as an example, it is set that the circuit configuration of the power transmission resonator 12-1 and that of the power reception device 21-1 are the same, but, the present embodiment is not limited to this, and the circuit configurations may also be different. In a similar manner, although it is set that the circuit configuration of the power transmission resonator 12-2 and that of the power reception device 21-2 are the same, the present embodiment is not limited to this, and the circuit configurations may also be different.

Further, as illustrated in FIG. 6, the inductor L1 of the power transmission resonator 12-1 and the inductor L1 of the power reception resonator 21-1 are disposed to face each other. In a similar manner, the inductor L2 of the power transmission resonator 12-2 and the inductor L2 of the power reception resonator 21-2 are disposed to face each other.

In the present embodiment, in a similar manner to the first embodiment, the difference between the frequency fp1 of the first power supply and the frequency fp2 of the second power supply (fp2−fp1) is greater than one-half the operating bandwidth BW1 of the first power transmission resonator, and is greater than one-half the operating bandwidth BW2 of the second power transmission resonator.

Figure 7:
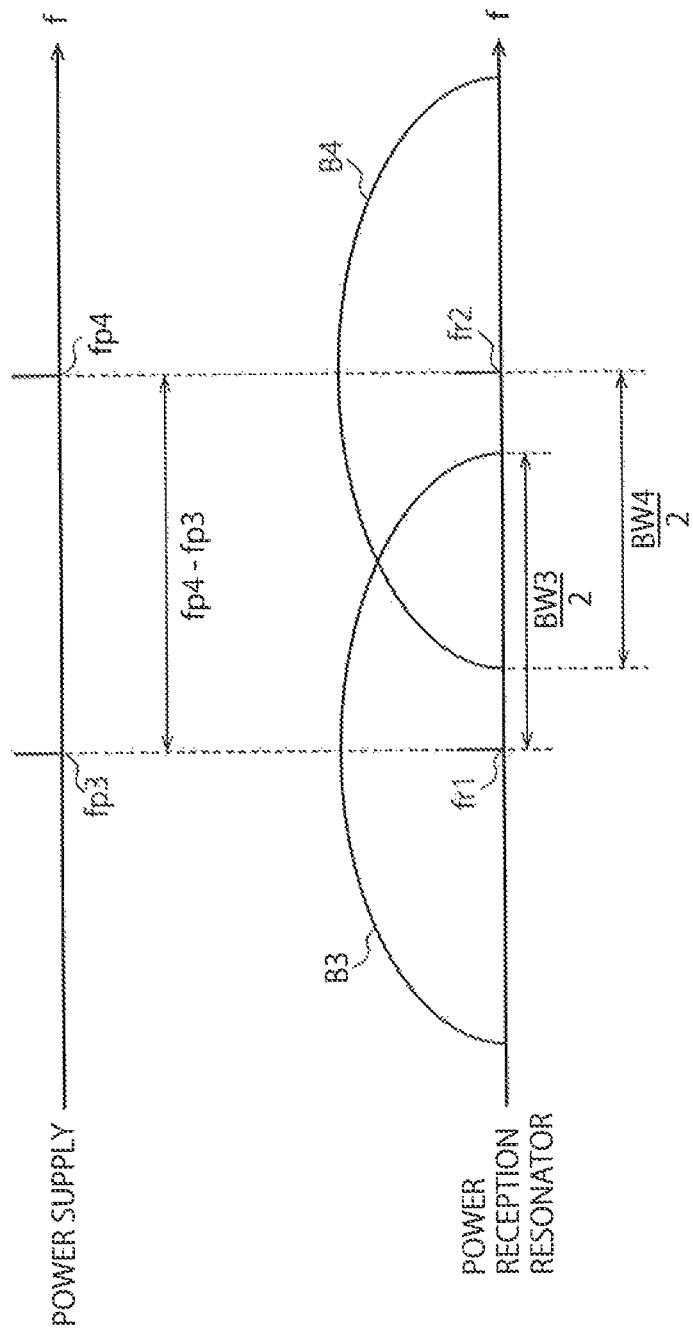
FIG. 7 is a diagram illustrating a first example of relation between operating bands of power reception resonators whose resonance frequencies are adjacent to each other on the frequency axis, and frequencies of power supplies corresponding to the power reception resonators.

Next, description will be made on relation between operating bands of the power reception resonators and frequencies between the respective power supplies 11-$i$ in the present embodiment by using FIG. 7. FIG. 7 is a diagram illustrating a first example of relation between operating bands of the power reception resonators whose resonance frequencies are adjacent to each other on the frequency axis, and frequencies of the power supplies corresponding to the power reception resonators.

Here, the resonance frequency of the power reception resonator 21-1 is set to fr1, and the resonance frequency of the power reception resonator 21-2 is set to fr2. Further, the frequency of the power supply 11-1 connected to the power transmission resonator 12-1 which faces the power reception resonator 21-1 is set to fp3, and the frequency of the power supply 11-2 connected to the power transmission resonator 12-2 which faces the power reception resonator 21-2 is set to fp4.

As illustrated in FIG. 7, a difference between the frequency fp3 of the power supply 11-1 and the frequency fp4 of the power supply 11-2 (fp4−fp3) is greater than one-half an operating bandwidth BW3 of the power reception resonator 21-1, and is greater than one-half an operating bandwidth BW4 of the power reception resonator 21-2.

When this condition is satisfied, the frequency fp4 of the power supply 11-2 is out of the operating band of the power reception resonator 21-1. Specifically, at the frequency fp4 of the power supply 11-2, the power reception resonator 21-1 is not magnetic-field-coupled to the power reception resonator 21-2 which resonates at the frequency fp4 of the power supply 11-2. In a similar manner, the frequency fp3 of the power supply 11-1 is out of the operating band of the power reception resonator 21-2. Specifically, at the frequency fp3 of the power supply 11-1, the power reception resonator 21-2 is not magnetic-field-coupled to the first power reception resonator which resonates at the frequency fp3 of the power supply 11-1. Therefore, since the magnetic-field-coupling does not occur between the power reception resonator 21-1 and the power reception resonator 21-2, it is possible to prevent deterioration of characteristics of the power reception resonators 21-1, 21-2, resulting in that the transmission efficiency can be improved.

(Effect of Second Embodiment)

The second embodiment includes the plurality of power transmission resonators, and the respective power transmission resonators perform wireless power transmission to the power reception resonators disposed to face the respective power transmission resonators. As described above, it is possible to perform the wireless power transmission from one power transmission resonator to one power reception resonator. For this reason, it becomes possible to simultaneously minimize a physical distance with respect to all pairs each consisting of the power transmission resonator and the power reception resonator. Consequently, when performing the wireless power transmission to the plurality of power reception resonators using the magnetic field resonance system, the transmission efficiency with respect to the power reception device can be improved.

Note that although the power reception resonator 21-1 is disposed to face the power transmission resonator 12-1, the present embodiment is not limited to this. There is also a case where the power reception resonator 21-1 is disposed to face any one of the other power transmission resonators 12-2, . . . , 12-n. In such a case, it is set that the operating band of the power reception resonator 21-1 includes a frequency of a power supply 11-j to which another power transmission resonator 12-j (where j indicates a number except for one) disposed to face the power reception resonator 21-1 is connected. Consequently, the power reception resonator 21-1 can wirelessly receive power from the other power transmission resonator 12-j through the magnetic field resonance.

As described above, it is also possible to design such that the operating band of the power reception resonator 21-1 or 21-2 includes any frequency out of the frequencies of the plurality of power supplies 11-1, . . . , 11-n.

Further, in such a case, it is also possible to set that the power reception resonator 21-1 has a resonance frequency same as the frequency of the power supply 11-j to which the other power transmission resonator 12-j (where j indicates a number except for one) disposed to face the power reception resonator 21-1 is connected. Consequently, the power reception resonator 21-1 can receive energy at a frequency, within its operating bandwidth, at which it can receive energy with the highest efficiency, and thus the transmission efficiency is improved.

Note that in the present embodiment, the description is made by assuming that the resonance frequencies of the respective power reception resonators 21-1, 21-2 are equal to the frequencies of the respective power supplies 11-1, 11-2 to which the power transmission resonators 12-1, 12-2 facing the power reception resonators 21-1, 21-2 are connected, but, the present embodiment is not limited to this. There is also a case where the resonance frequencies of the respective power reception resonators 21-1, 21-2 are different from the frequencies of the respective power supplies 11-1, 11-2 to which the power transmission resonators 12-1, 12-2 facing the power reception resonators 21-1, 21-2 are connected.

By citing such a case as an example, operating bands of power reception resonators whose resonance frequencies are adjacent to each other on the frequency axis will be described by using FIG. 8.

Figure 8:
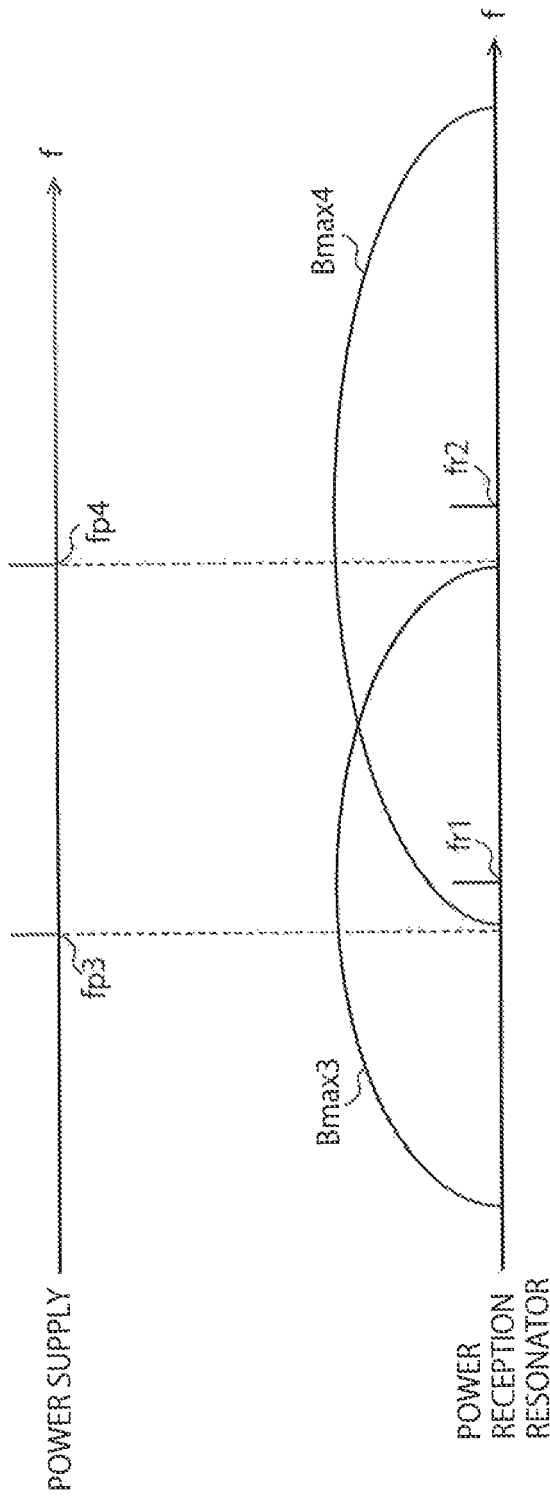
FIG. 8 is a diagram illustrating a second example of relation between operating bands of power reception resonators whose resonance frequencies are adjacent to each other on the frequency axis, and frequencies of power supplies corresponding to the power reception resonators.

FIG. 8 is a diagram illustrating a second example of relation between operating bands of power reception resonators whose resonance frequencies are adjacent to each other on the frequency axis, and frequencies of power supplies corresponding to the power reception resonators. Hereinafter, out of the power reception resonators 21-1, 21-2 whose resonance frequencies are adjacent to each other on the frequency axis, out of the plurality of power reception resonators, the power reception resonator 21-1 is referred to as a first power reception resonator, and the power reception resonator 21-2 is referred to as a second power reception resonator. As illustrated in FIG. 8, the resonance frequency fr1 of the first power reception resonator is different from the frequency fp3 of the power supply 11-1 (referred to as a third power supply, hereinafter) connected to the power transmission resonator 12-1 (referred to as a third power transmission resonator, hereinafter) facing the first power reception resonator. The resonance frequency fr2 of the second power reception resonator is different from the frequency fp4 of the power supply 11-2 (referred to as a fourth power supply, hereinafter) connected to the power transmission resonator 21-2 (referred to as a fourth power transmission resonator, hereinafter) facing the second power reception resonator.

The first power reception resonator and the second power reception resonator are set to satisfy the following operating band condition of the power reception resonators. As indicated by a maximum band Bmax3 capable of being obtained by the first power reception resonator in FIG. 8, the operating band of the first power reception resonator includes the frequency fp3 of the third power supply connected to the third power transmission resonator facing the first power reception resonator, and does not include the frequency fp4 of the fourth power supply connected to the fourth power transmission resonator facing the second power reception resonator.

Further, as indicated by a maximum band Bmax4 capable of being obtained by the second power reception resonator in FIG. 8, the operating band of the second power reception resonator does not include the frequency fp3 of the third power supply, and Includes the frequency fp4 of the fourth power supply.

By setting as described above, the frequency fp4 of the fourth power supply is out of the operating band of the first power reception resonator. Specifically, at the frequency fp4 of the fourth power supply, the first power reception resonator is not magnetic-field-coupled to the second power reception resonator which resonates at the frequency fp4 of the fourth power supply. In a similar manner, the frequency fp3 of the third power supply is out of the operating band of the second power reception resonator. Specifically, at the frequency fp3 of the third power supply, the second power reception resonator is not magnetic-field-coupled to the first power reception resonator which resonates at the frequency fp3 of the third power supply. Therefore, since the magnetic-field-coupling does not occur between the power reception resonators, it is possible to prevent deterioration of characteristics of the power reception resonators, resulting in that the transmission efficiency between the power transmission resonator and the power reception resonator can be improved.

Note that in the present embodiment, it is set that all pairs each consisting of the first power reception resonator and the second power reception resonator satisfy the aforementioned operating band condition of the power reception resonators, but, it is also possible to set that at least one pair consisting of the first power reception resonator and the second power reception resonator satisfies the aforementioned operating band condition of the power reception resonators.

Further, although the second embodiment is designed such that the pair of power reception resonators whose resonance frequencies are adjacent to each other satisfies the aforementioned operating band condition of the power reception resonators, it is not limited to this. It is also possible to design such that a pair of power reception resonators whose resonance frequencies are not adjacent to each other satisfies the aforementioned operating band condition of the power reception resonators. Consequently, the magnetic-field-coupling does not occur, at the frequency fp3 of the third power supply and the frequency fp4 of the fourth power supply, between the power reception resonators satisfying this condition, so that when performing the wireless power transmission to the plurality of power reception resonators using the magnetic field resonance system, the transmission efficiency with respect to the power reception device can be improved.

First Modified Example of Second Embodiment

Figure 9:
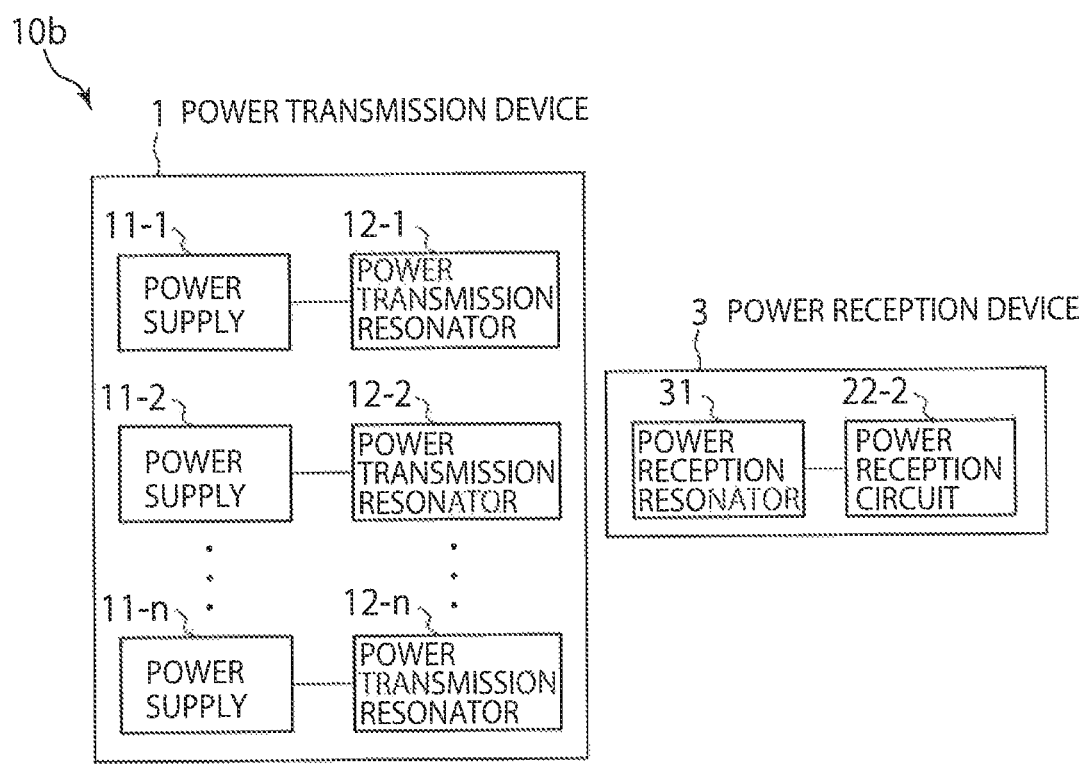
FIG. 9 is a diagram illustrating a configuration of a power transmission system 10b in a first modified example of the second embodiment.

Next, a first modified example of the second embodiment will be described. FIG. 9 is a diagram illustrating a configuration of a power transmission system 10b in the first modified example of the second embodiment. Although the power transmission system 10 in FIG. 5 includes the two power reception devices 2-1, 2-2, the power transmission system 10b in FIG. 9 includes one power reception device 3. Note that elements common to those in FIG. 5 are denoted by the same reference signs, and concrete description thereof will be omitted.

The power reception device 3 includes a power reception resonator 31, and the power reception circuit 22-2.

A resonance frequency of the power reception resonator 31 has a value in a range from a value of a minimum frequency to a value of a maximum frequency out of the frequencies of the power supplies 11-1, 11-2, . . . , 11-n. For example, the resonance frequency of the power reception resonator 31 is an average frequency between the minimum frequency out of the frequencies of the power supplies 11-1, 11-2, . . . , 11-n, and the maximum frequency out of the frequencies of the power supplies 11-1, 11-2, . . . , 11-n.

Accordingly, as a result of this, even if the power reception resonator 31 is disposed to face any of the power transmission resonators, it is possible to perform wireless power transmission with a certain transmission efficiency or more. For this reason, it is possible to obtain effect of improving a degree of freedom regarding the position of the power reception device.

Here, the certain transmission efficiency or more means a transmission efficiency equal to or more than a transmission efficiency at the minimum frequency out of the frequencies of the power supplies 11-1, 11-2, . . . , 11-n, or a transmission efficiency equal to or more than a transmission efficiency at the maximum frequency out of the frequencies of the power supplies 11-1, 11-2, . . . , 11-n.

At the frequency in the range from the minimum frequency to the maximum frequency, the certain transmission efficiency or more is obtained. This is based on a phenomenon in which the transmission efficiency monotonously decreases as a difference between a resonance frequency of a power transmission resonator and a resonance frequency of a power reception resonator becomes large.

Note that the resonance frequency of the power reception resonator 31 may also have a value being a center value, the minimum value, or the maximum value of the frequencies of the power supplies 11-1, 11-2, . . . , 11-n.

As described above, in the first modified example of the second embodiment, the resonance frequency of the power reception resonator 31 has the value in the range from the value of the minimum frequency to the value of the maximum frequency out of the frequencies of the power supplies 11-1, 11-2, . . . , 11-n. Consequently, even when the position of the power reception device is changed, the certain transmission efficiency or more can be obtained, resulting in that the degree of freedom regarding the position of the power reception device is improved.

Further, when the power reception device is a movable body such as a vehicle or railroad, the power reception device can receive power while moving. When the power reception device receives power while moving, there are a case where it receives power while moving, and a case where it once stops at a moving destination to receive power, and it moves again after receiving the power. By configuring the wireless power transmission system as in the first modified example, it becomes possible to perform, in either of these two cases, the wireless power transmission with the certain transmission efficiency or more.

Second Modified Example of Second Embodiment

Figure 10:
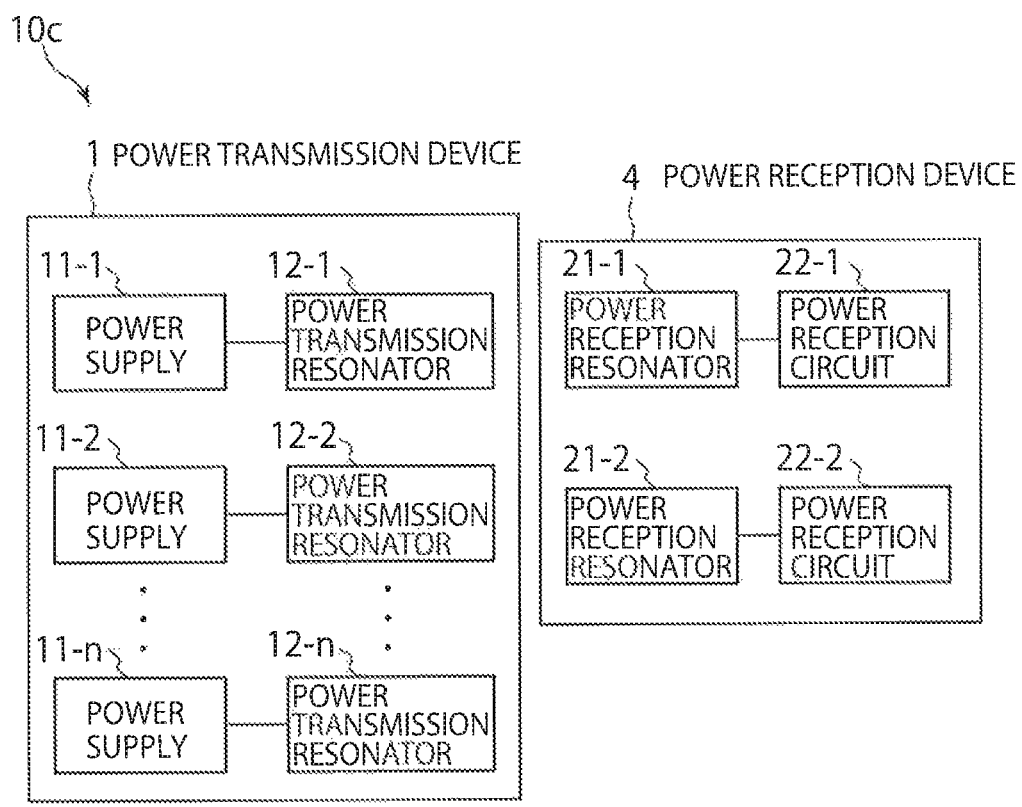
FIG. 10 is a diagram illustrating a configuration of a power transmission system 10c in a second modified example of the second embodiment.

Next, a second modified example of the second embodiment will be described. FIG. 10 is a diagram illustrating a configuration of a power transmission system 10c in the second modified example of the second embodiment. Note that elements common to those in FIG. 5 are denoted by the same reference signs, and concrete description thereof will be omitted. As illustrated in FIG. 10, in the power transmission system 10c, a change is made so that a power reception device 4 has a configuration of the two power reception devices 2-1, 2-2 in the power transmission system 10 in FIG. 5.

In the second modified example, the power reception device 4 is disposed so that the power reception resonator 21-1 faces the power transmission resonator 12-1, and the power reception resonator 21-2 faces the power transmission resonator 12-1, as an example. Here, the resonance frequencies of the power reception resonators 21-1, 21-2 are mutually different.

Further, the resonance frequency of the power reception resonator 21-1 is the same as the frequency of the power supply 11-1 of the power transmission device 1, for example. Accordingly, the power reception resonator 21-1 resonates at a frequency f1 of the power supply 11-1 of the power transmission device. Therefore, it becomes possible to perform wireless power transmission with high efficiency, between the power transmission resonator 12-1 which resonates at the frequency f1 and the power reception resonator 21-1 which resonates at the frequency f1.

In like manner, the resonance frequency of the power reception resonator 21-2 is the same as the frequency of the power supply 11-2 of the power transmission device 1, for example. Accordingly, the power reception resonator 21-2 resonates at a frequency f2 of the power supply of the power transmission device. Therefore, it becomes possible to perform wireless power transmission with high efficiency, between the power transmission resonator 12-2 which resonates at the frequency f2 and the power reception resonator 21-2 which resonates at the frequency f2.

Consequently, it becomes possible to perform wireless power transmissions in a parallel manner between the two pairs of the power transmission resonators and the power reception resonators, so that an amount of power capable of being transmitted to the power reception device 4 becomes twice an amount of power capable of being transmitted to each of the power reception devices in the second embodiment illustrated in FIG. 5.

In the second modified example, the current which passes through the power transmission resonators and the power reception resonators does not change, when compared to the second embodiment illustrated in FIG. 5, so that there is no change in the temperature rise of the power transmission resonators or the power reception resonators due to heat generation, when compared to the second embodiment illustrated in FIG. 5.

As described above, in the second modified example of the second embodiment, the power reception device 4 includes the plurality of power reception resonators. Accordingly, it becomes possible to perform the wireless power transmissions in a parallel manner to the power reception device 4, so that it is possible to increase the amount of power capable of being transmitted to the power reception device 4.

Further, the resonance frequency of each of the power reception resonators is the same as the frequency of the power supply to which the power transmission resonator facing each of the power reception resonators is connected, for example. Accordingly, each of the power reception resonators resonates at the frequency of the power supply. Therefore, it becomes possible to perform the wireless power transmission with high efficiency between the power transmission resonator which resonates at the frequency of the power supply and the power reception resonator which resonates at the frequency of the power supply.

Note that although it is set that the resonance frequency of the power reception resonator 21-1 is the same as the frequency of the power supply 11-1 of the power transmission device 1, and the resonance frequency of the power reception resonator 21-2 is the same as the frequency of the power supply 11-2 of the power transmission device 1, the present embodiment is not limited to this. The resonance frequency of the power reception resonator 21-1 may also be the same as the frequency of any one of the other power supplies 11-2 to 11-$n$. The resonance frequency of the power reception resonator 21-2 may also be the same as the frequency of any one of the other power supplies 11-1, 11-3 to 11-$n$. Note that, even in that case, the resonance frequency of the power reception resonator 21-2 is different from the resonance frequency of the power reception resonator 21-1.

Note that the second modified example describes the case where the number of the power reception resonators in the power reception device 4 is two, but, it is not limited to this. The number of the power reception resonators in the power reception device 4 may also be three or more.

Third Embodiment

Next, a third embodiment will be described. In the third embodiment, a condition is further added to the condition regarding the frequencies of the power supplies set in the power transmission device 1 in the first embodiment. Here, the addition of condition means that both of the condition regarding the frequencies of the power supplies described in the first embodiment and a condition regarding frequencies of power supplies in the present embodiment are satisfied. By adding the condition regarding the frequencies of the power supplies as described above, it is possible to reduce leakage electromagnetic field intensity. Description will be made in detail hereinafter.

When current is passed through a power transmission resonator in a power transmission device or a power reception resonator, an electric field or a magnetic field is generated around the resonator. When an electronic apparatus is placed and operated under an environment where electric field intensity or magnetic field intensity is high, the electronic apparatus may be interfered. Accordingly, it is sometimes required not to excessively increase the intensity of the electric field or the intensity of the magnetic field leaked from the power transmission device.

International Special Committee on Radio Interference (CISPR) establishes one of standard measuring methods regarding the electric field intensity or the magnetic field intensity. As one of parameters in the standard measuring method, there can be cited a measurement frequency bandwidth. The intensity of the leakage electric field, or the intensity of the magnetic field is limited to fall within a certain frequency bandwidth, and the electric field intensity or the magnetic field intensity is measured within the frequency bandwidth. In this method, when there are a plurality of leakage wave sources, and frequencies of the plurality of leakage wave sources are different, the following can be mentioned. Note that description will be continued by assuming that the frequency of the leakage wave source and the frequency of the leakage electric field or the magnetic field are the same.

When there are leakage electric fields or magnetic fields at a plurality of frequencies, and if the frequencies of these leakage electric fields or magnetic fields are not within the same measurement frequency band set for interference noise measurement, the leakage electric fields or the magnetic fields are regarded as different leakage electric fields or magnetic fields. On the other hand, if the frequencies of the leakage electric fields or the magnetic fields are within the same frequency band, the leakage electric fields or the magnetic fields are regarded as the same electric fields or magnetic fields.

When the electric fields or the magnetic fields at the plurality of frequencies are regarded as the same electric fields or magnetic fields, a degree of interference with respect to an electronic apparatus is judged based on a total value of the electric fields or the magnetic fields. In such a case, there is a need to set a total value of the leakage electric field intensities or the magnetic field intensities at the plurality of frequencies to be equal to or less than a maximum tolerance value of the Intensities.

On the other hand, when the electric fields or the magnetic fields at the plurality of frequencies are regarded as the different electric fields or magnetic fields, it is construed such that the electric fields or the magnetic fields respectively and separately interfere with the electronic apparatus. Therefore, it is only required that the leakage electric field intensity or the magnetic field intensity at each of the plurality of frequencies is equal to or less than the set maximum tolerance value.

In the present embodiment, for example, when frequencies of the plurality of power supplies 11-1 to 11-$n$ are ordered, and if, out of adjacent frequencies, a lower frequency (referred to as a first fundamental frequency, hereinafter) is within the frequency band set for the interference noise measurement, a frequency difference between the adjacent frequencies is set to be greater than a measurement frequency bandwidth which is set in accordance with the frequency band.

Figure 11A:
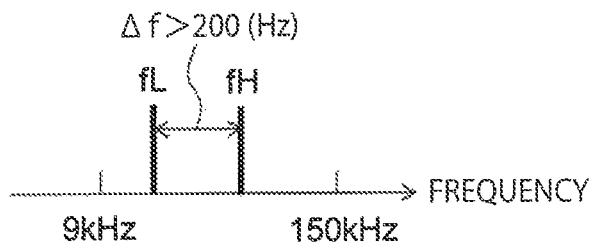
FIG. 11A is a diagram illustrating a first example of a condition regarding a frequency difference added in a third embodiment.

FIG. 11A is a diagram illustrating a first example of a condition regarding a frequency difference added in the third embodiment. As illustrated in FIG. 11A, when a first fundamental frequency fL is in a range from 9 kHz to 150 kHz, a frequency difference $\Delta f$ (=fH−fL) between the first fundamental frequency and a second fundamental frequency is set to be greater than 200 Hz. This setting indicates an example where the frequency band set for the interference noise measurement is in a range from 9 kHz to 150 kHz, and the measurement frequency bandwidth set in accordance with the frequency band is 200 Hz. A standard measurement frequency bandwidth at the frequency band from 9 kHz to 150 kHz defined by the CISPR is 200 Hz.

Figure 11B:
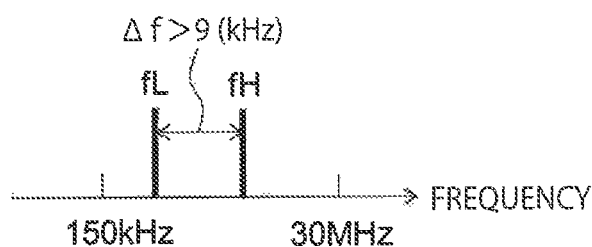
FIG. 11B is a diagram illustrating a second example of the condition regarding the frequency difference added in the third embodiment.

FIG. 11B is a diagram illustrating a second example of the condition regarding the frequency difference added in the third embodiment. As illustrated in FIG. 11B, when a first fundamental frequency fL is in a range from 150 kHz to 30 MHz, a frequency difference $\Delta f$ (=fH−fL) between the first fundamental frequency and a second fundamental frequency may also be set to be greater than 9 kHz. This setting indicates an example where the frequency band set for the interference noise measurement is in a range from 150 kHz to 30 MHz, and the measurement frequency bandwidth set in accordance with the frequency band is 9 kHz. A standard measurement frequency bandwidth at the frequency band from 150 kHz to 30 MHz defined by the CISPR is 9 kHz.

Figure 11C:
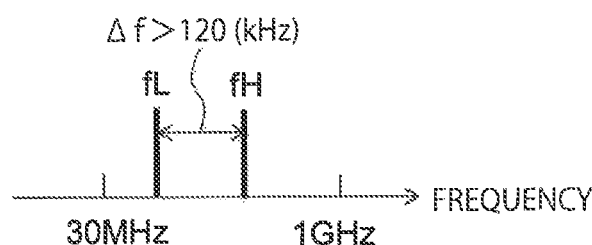
FIG. 11C is a diagram illustrating a third example of the condition regarding the frequency difference added in the third embodiment.

FIG. 11C is a diagram illustrating a third example of the condition regarding the frequency difference added in the third embodiment. As illustrated in FIG. 11C, when a first fundamental frequency fL is in a range from 30 MHz to 1 GHz, a frequency difference $\Delta f$ (=fH−fL) between the first fundamental frequency and a second fundamental frequency may also be set to be greater than 120 kHz. This setting indicates an example where the frequency band set for the Interference noise measurement is in a range from 30 MHz to 1 GHz, and the measurement frequency bandwidth set in accordance with the frequency band is 120 kHz. A standard measurement frequency bandwidth in the range of frequency from 30 MHz to 1 GHz defined by the CISPR is 120 kHz.

Therefore, by setting as in any one of the first example to the third example, the electric fields or the magnetic fields at the plurality of frequencies are regarded as different electric fields or magnetic fields. In this case, it is only required that the leakage electric field intensity or the magnetic field intensity at each of the first fundamental frequency fL and the second fundamental frequency fH is equal to or less than the set maximum tolerance value, so that it is possible to reduce the possibility that the leakage electric field intensity or the magnetic field intensity exceeds the maximum tolerance value.

As described above, in the present embodiment, the condition regarding the frequencies of the power supplies in the first embodiment is satisfied, and in addition to that, when the frequencies of the plurality of power supplies 11-1 to 11-n are ordered, and if, out of the adjacent frequencies, the lower frequency is within the frequency band set for the interference noise measurement, the frequency difference between the adjacent frequencies is set to be greater than the measurement frequency bandwidth which is set in accordance with the frequency band.

Accordingly, electric fields or magnetic fields at different frequencies leaked from the power transmission device 1 can be regarded as different electric fields or magnetic fields, so that even if a plurality of frequencies are used, it is possible to reduce the possibility that the leakage electric field intensity or the magnetic field intensity measured within the specified measurement frequency bandwidth exceeds the maximum tolerance value.

First Modified Example of Third Embodiment

Figure 12:
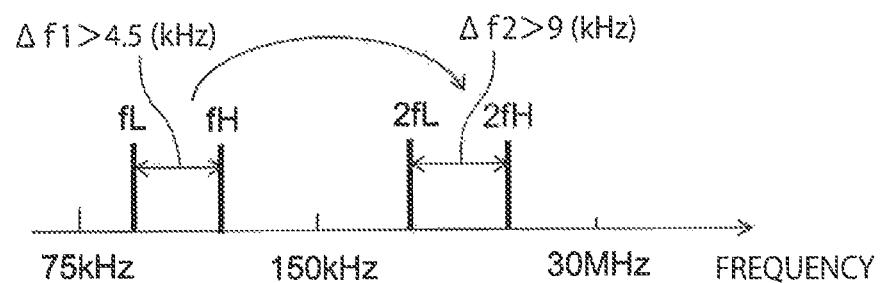
FIG. 12 is a diagram illustrating an example of a condition regarding a frequency difference added in a first modified example of the third embodiment.

Next, a first modified example will be described. FIG. 12 is a diagram illustrating an example of a condition regarding a frequency difference added in the first modified example of the third embodiment. As illustrated in FIG. 12, when a first fundamental frequency fL is in a range from 75 kHz to 150 kHz, a frequency difference $\Delta f1$ (=fH−fL) between the first fundamental frequency and a second fundamental frequency may also be set to be greater than 4.5 kHz. This setting indicates an example where the frequency band set for the interference noise measurement is in a range from 75 kHz to 150 kHz, and the measurement frequency bandwidth set in accordance with the frequency band is 4.5 kHz.

Accordingly, a frequency 2fL being a second harmonic of the first fundamental frequency fL is in a range from 150 kHz to 30 MHz, and a frequency difference $\Delta f2$ (=2fH−2fL) of the second harmonics exceeds 9 kHz.

Here, the standard measurement frequency bandwidth in the range of frequency from 150 kHz to 30 MHz defined by the CISPR is 9 kHz. By setting the frequencies of the power supplies as described above, the frequency difference of the second harmonics of the frequencies used for the wireless power transmission can be set to be greater than 9 kHz. Accordingly, when the wireless power transmission is performed, there is a case where harmonics of integral multiple of the frequencies used for power transmission are generated, but, the frequency difference of the second harmonics becomes greater than the standard measurement frequency bandwidth in the range of frequency from 150 kHz to 30 MHz.

Further, the frequency difference between the adjacent frequencies used for the wireless power transmission is greater than 4.5 kHz, and thus is greater than 200 Hz, which is the standard measurement frequency bandwidth of the CISPR.

Therefore, according to this first modified example, the electric fields or the magnetic fields at the plurality of frequencies at which the wireless power transmission is conducted, and the electric fields or the magnetic fields at the second harmonics of the plurality of frequencies can be respectively regarded as separate electric fields or magnetic fields. Accordingly, at the plurality of frequencies at which the wireless power transmission is conducted, and also at the second harmonics of the plurality of frequencies, it is possible to reduce the possibility that the leakage electric field intensity or the magnetic field intensity measured within the specified measurement frequency bandwidth exceeds the maximum tolerance value.

Second Modified Example of Third Embodiment

Figure 13:
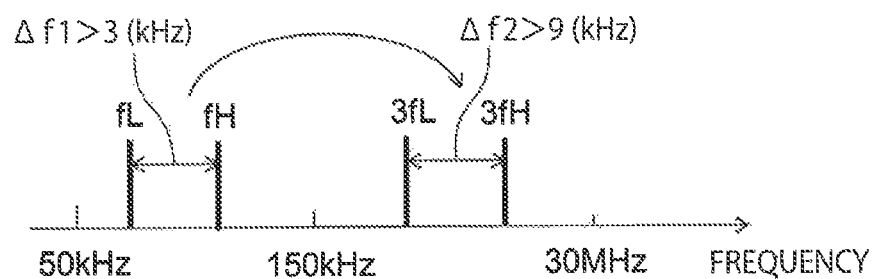
FIG. 13 is a diagram illustrating an example of a condition regarding a frequency difference added in a second modified example of the third embodiment.

Next, a second modified example will be described. FIG. 13 is a diagram illustrating an example of a condition regarding a frequency difference added in the second modified example of the third embodiment. As illustrated in FIG. 13, when a first fundamental frequency fL is in a range from 50 kHz to 150 kHz, a frequency difference $\Delta f1$ (=fH−fL) between the first fundamental frequency and a second fundamental frequency may also be set to be equal to or greater than 3 kHz. This setting indicates an example where the frequency band set for the Interference noise measurement is in a range from 50 kHz to 150 kHz, and the measurement frequency bandwidth set in accordance with the frequency band is 3 kHz.

Accordingly, a frequency 3fL being a third harmonic of the first fundamental frequency fL is in a range from 150 kHz to 30 MHz, and a frequency difference $\Delta f2$ (=3fH−3fL) of the third harmonics exceeds 9 kHz.

Here, the standard measurement frequency bandwidth in the range of frequency from 150 kHz to 30 MHz defined by the CISPR is 9 kHz. By setting the frequencies of the power supplies as described above, the frequency difference of the third harmonics of the frequencies used for the wireless power transmission can be set to be greater than 9 kHz. Accordingly, when the wireless power transmission is performed, there is a case where harmonics of odd-number multiple of the frequencies used for power transmission are generated, but, the frequency difference of the third harmonics becomes greater than the standard measurement frequency bandwidth in the range of frequency from 150 kHz to 30 MHz.

Further, the frequency difference between the adjacent frequencies used for the wireless power transmission is greater than 3 kHz, and thus is greater than 200 Hz, which is the standard measurement frequency bandwidth of the CISPR.

Therefore, according to this second modified example, the electric fields or the magnetic fields at the plurality of frequencies at which the wireless power transmission is conducted, and the electric fields or the magnetic fields at the third harmonics of the plurality of frequencies can be respectively regarded as separate electric fields or magnetic fields. Accordingly, at the plurality of frequencies at which the wireless power transmission is conducted, and also at the third harmonics of the plurality of frequencies, it is possible to reduce the possibility that the leakage electric field intensity or the magnetic field intensity measured within the specified measurement frequency bandwidth exceeds the maximum tolerance value.

Fourth Embodiment

Next, a fourth embodiment will be described. The present embodiment is different from the first embodiment in a point that each of a plurality of power supplies included in a power transmission device is provided with a plurality of sub-power supplies having the same frequency, and each of a plurality of power transmission resonators is provided with a plurality of sub-power transmission resonators having the same resonance frequency. Further, each of a plurality of power reception resonators included in a power reception device is provided with a plurality of sub-power reception resonators having the same resonance frequency. Accordingly, it is possible to perform wireless power transmissions in parallel at respective frequencies, to thereby increase transmission power in the wireless power transmission at the respective frequencies.

Figure 14:
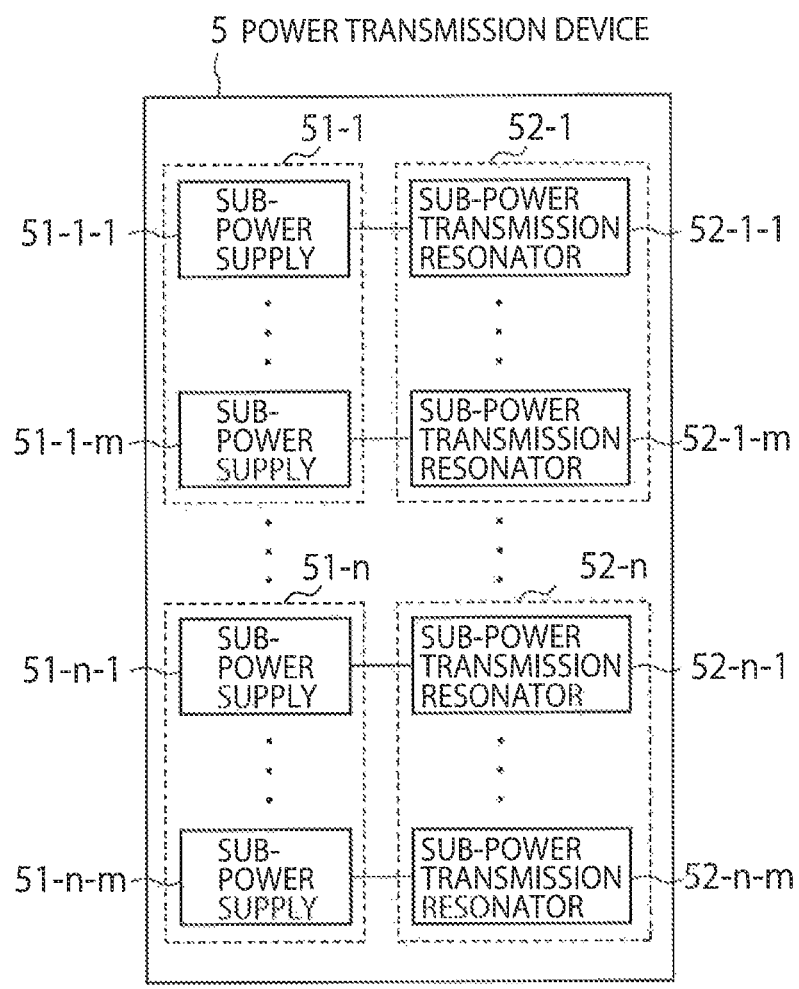
FIG. 14 is a diagram illustrating a configuration of a power transmission device 5 in a fourth embodiment.

FIG. 14 is a diagram illustrating a configuration of a power transmission device 5 in the fourth embodiment. As illustrated in FIG. 14, the power transmission device 5 includes n power supplies 51-$i$ ($i$ is an integer from 1 to n) of power supplies 51-1, . . . , 51-$n$ (n is an integer of 1 or larger), and n power transmission resonators 52-$i$ of power transmission resonators 52-1, . . . , 52-$n$.

Here, each of the power supplies 51-$i$ includes m sub-power supplies 51-$i$-$j$ (j is an integer from 1 to m) of sub-power supplies 51-$i$-1, . . . , 51-$i$-$m$ (m is an integer of 2 or larger). The sub-power supplies 51-$i$-1, . . . , 51-$i$-$m$ output AC powers having the same frequency.

Further, each of the power transmission resonators 52-$i$ includes m sub-power transmission resonators 52-$i$-$j$ of sub-power transmission resonators 52-$i$-1, . . . , 52-$i$-$m$. Each of the sub-power transmission resonators 52-$i$-$j$ is connected to the sub-power supply 51-$i$-$j$ with the same indices i and j. The sub-power transmission resonators 52-$i$-1, . . . , 52-$i$-$m$ are circuits having mutually the same resonance frequency, as an example, and the resonance frequencies thereof are the same as the frequencies of the sub-power supplies 51-$i$-1, . . . , 51-$i$-$m$ with the same index i.

Accordingly, each of the sub-power transmission resonators 52-$i$-$j$ resonates at its resonance frequency by using the AC power output by the sub-power supply 51-$i$-$j$. As described above, by setting the number of wireless power transmissions performed in parallel at respective frequencies to m, the maximum value of the transmission power in the wireless power transmission at each of the frequencies can be multiplied by m.

Figure 15:
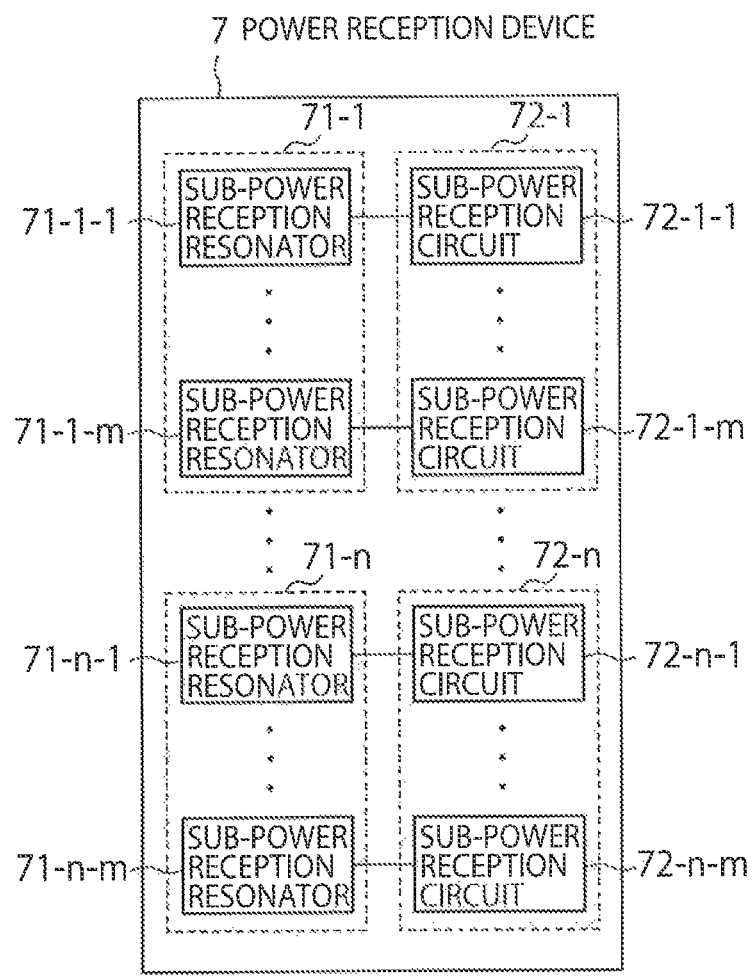
FIG. 15 is a diagram illustrating a configuration of a power reception device 7 in the fourth embodiment.

Next, a configuration of a power reception device 7 in the fourth embodiment will be described. FIG. 15 is a diagram illustrating the configuration of the power reception device 7 in the fourth embodiment. As illustrated in FIG. 15, the power reception device 7 includes n power reception resonators 51-$i$ (i is an integer from 1 to n) of power reception resonators 71-1, . . . , 71-$n$ (n is an integer of 1 or larger), and n power reception circuits 72-$i$ of power reception circuits 72-1, . . . , 72-$n$.

Here, each of the power reception resonators 71-1 includes m sub-power reception resonators 71-$i$-$j$ of sub-power reception resonators 71-$i$-1, . . . , 71-$i$-$m$. The sub-power reception resonators 71-$i$-1, . . . , 71-$i$-$m$ are power reception resonators having mutually the same resonance frequency, as an example, and the resonance frequencies thereof are the same as the frequencies of the sub-power supplies 51-$i$-1, . . . , 51-$i$-$m$ in FIG. 14 with the same index i, as an example. Accordingly, each of the sub-power reception resonators 71-$i$-1, . . . , 71-$i$-$m$ can resonate at its resonance frequency, which enables to improve the transmission efficiency.

Note that the resonance frequencies of the sub-power reception resonators 71-$i$-1, . . . , 71-$i$-$m$ may also be the same as the frequencies of other sub-power supplies 51-$k$-1, . . . , 51-$k$-$m$ (here, k is different from i, and is an integer from 1 to n) in FIG. 14.

Further, each of the power reception circuits 72-$i$ includes m sub-power reception circuits 72-$i$-$j$ of sub-power reception circuits 72-$i$-1, . . . , 72-$i$-$m$. Each of the sub-power reception circuits 72-$i$ is connected to the sub-power reception resonator with the same indices i and j.

By configuring the power reception device as described above, it is possible to efficiently receive transmitted large power. When the number of the sub-power transmission resonators in the power transmission device 5 and the number of the sub-power reception resonators in the power reception device 7 match as in the present embodiment, it is possible to perform wireless power transmission by using all of the power transmission resonators.

On the other hand, when the number of the power transmission resonators in the power transmission device and the number of the power reception resonators do not match, there are following two cases. One of the cases is a case where the number of the sub-power transmission resonators is larger than the number of the sub-power reception resonators. In this case, it is possible to receive power by using all of the sub-power reception resonators in the power reception device. The remaining sub-power transmission resonator can also be used for wireless power transmission with respect to another power reception device, or it does not have to perform the wireless power transmission.

The other case is a case where the number of the sub-power transmission resonators is smaller than the number of the sub-power reception resonators. In this case, although not all of the power reception resonators can perform power reception, only a part of the power reception resonators may perform the power reception.

As described above, according to the present embodiment, by increasing the number of wireless power transmissions performed in parallel at respective frequencies, without increasing the number of frequencies, it is possible to increase the amount of transmission power. The present embodiment is particularly effective in a case where frequency resources are finite, and thus there is restriction to use a frequency within a specific frequency range.

Note that in the present embodiment, all of the plurality of power supplies included in the power transmission device are formed of the plurality of sub-power supplies having the same frequency, but, the present embodiment is not limited to this. It is also possible that a part of the plurality of power supplies included in the power transmission device is formed of the plurality of sub-power supplies having the same frequency.

In view of the above description, in the power transmission device 5 in the fourth embodiment, at least one of the plurality of power supplies includes a plurality of sub-power supplies which output AC powers each having the same frequency. At least one of the plurality of power transmission resonators includes a plurality of sub-power transmission resonators which are connected to different ones of the plurality of sub-power supplies.

Accordingly, by increasing the number of wireless power transmissions performed in parallel at respective frequencies, without increasing the number of frequencies, it is possible to increase the amount of transmission power.

Modified Example of Fourth Embodiment

Next, a modified example of the fourth embodiment will be described. In the modified example of the fourth embodiment, phases of AC powers output by the plurality of sub-power supplies are controlled so that electromagnetic fields leaked from the plurality of sub-power transmission resonators are mutually cancelled.

Figure 16:
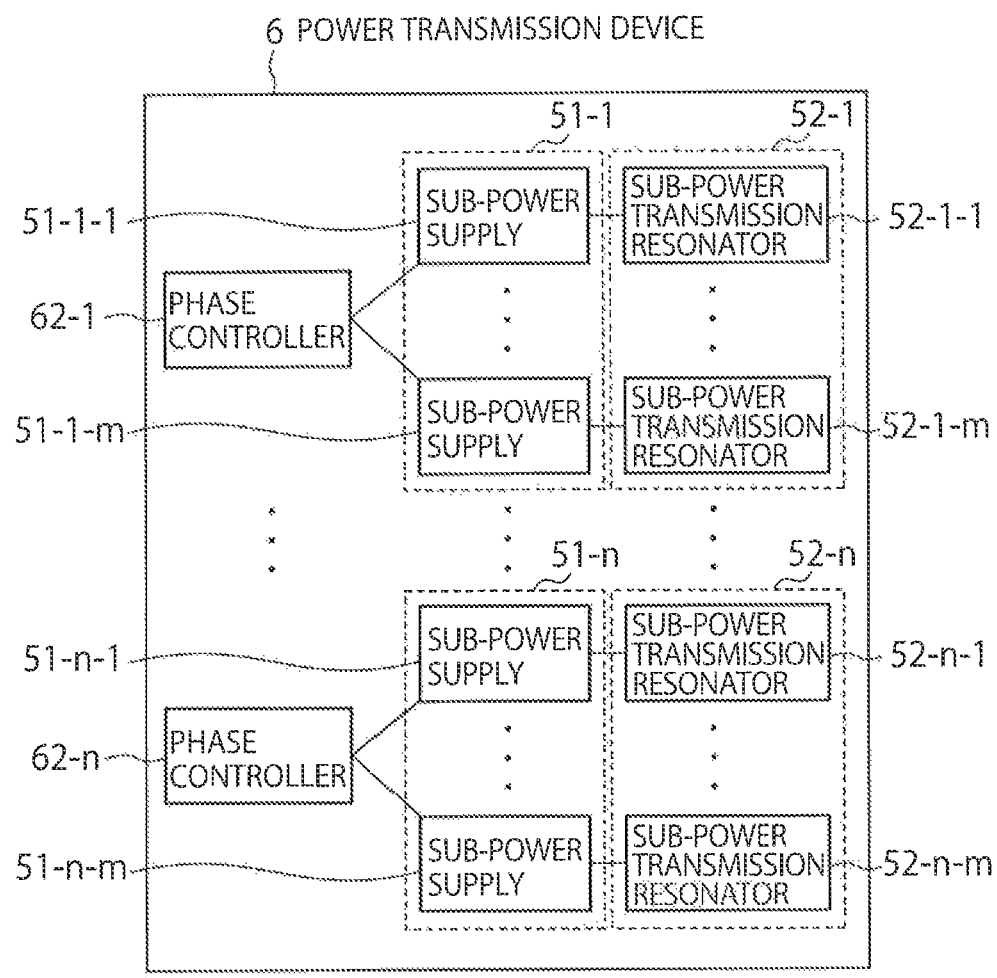
FIG. 16 is a diagram illustrating a configuration of a power transmission device 6 in a modified example of the fourth embodiment.

FIG. 16 is a diagram illustrating a configuration of a power transmission device 6 in the modified example of the fourth embodiment. Note that elements common to those in FIG. 14 are denoted by the same reference signs, and concrete description thereof will be omitted. The configuration of the power transmission device 6 in FIG. 16 corresponds to the configuration of the power transmission device 5 in FIG. 14 to which n phase controllers 62-$i$ of phase controllers 62-1, ..., 62-$n$ are added.

Each of the phase controllers 62-$i$ is connected to the m sub-power supplies 51-$i$-1, ..., 51-$i$-$m$. Further, each of the phase controllers 62-$i$ controls phases of AC powers output by the m sub-power supplies 51-$i$-1, ..., 51-$i$-$m$, so that electromagnetic fields leaked from the m sub-power transmission resonators 52-$i$-1, ..., 52-$i$-$m$ are mutually cancelled. Consequently, it is possible to reduce the electric fields or the magnetic fields leaked from the m sub-power transmission resonators 52-$i$-1, ..., 52-$i$-$m$.

Here, the intensity of the electric field or the magnetic field leaked from the sub-power transmission resonator is in proportion to an amplitude of current which passes through the sub-power transmission resonator. Further, the phase of the electric field or the magnetic field leaked from the sub-power transmission resonator corresponds to a phase of the current which passes through the sub-power transmission resonator. Here, the correspondence means that the phase of the current and the phase of the electric field or the magnetic field have a linear relation such that, when the phase of the current is changed by 10 degrees, the phase of the electric field or the magnetic field is also changed by 10 degrees.

Therefore, by controlling the phases of the currents which pass through the m sub-power transmission resonators 52-$i$-1, ..., 52-$i$-$m$, the phases of the electric fields or the magnetic fields leaked from the m sub-power transmission resonators 52-$i$-1, ..., 52-$i$-$m$ are also controlled. For example, a case where the number of sub-power transmission resonators is two (namely, m=2), and current phases of the respective resonators are controlled to 0 degrees and 180 degrees, respectively, is supposed. In this case, the electric fields or the magnetic fields leaked from the sub-power transmission resonators have a phase difference of 180 degrees. The synthesis of magnetic fields with the phase difference of 180 degrees, is equivalent to mutual cancellation of the magnetic fields.

Further, when the number of sub-power transmission resonators is three (namely, m=3) or more, current phases of the respective resonators may also be controlled to 0 degrees, 120 degrees, and 180 degrees, respectively. As described above, when the number of sub-power transmission resonators is m, it is also possible to perform control to make the respective current phases of the sub-power transmission resonators shift by 360/m degrees.

Here, the effect of mutual cancellation of the magnetic fields is determined by the amplitudes of currents which pass through the sub-power transmission resonators. When the current amplitudes of both of the resonators are the same, the effect of mutual cancellation of the magnetic fields is maximized. As the current amplitudes of both of the resonators get close to each other, the effect of mutual cancellation of the magnetic fields becomes large, and as the difference between the current amplitudes of both of the resonators increases, the effect of mutual cancellation of the magnetic fields becomes small. Note that it is possible to reduce the leaked electric fields or magnetic fields only by the phase control, although the effect of mutual cancellation of the magnetic fields becomes small.

From the above description, the respective phase controllers 62-$i$ may also control amplitudes of AC powers output by the m sub-power supplies 51-$i$-1, ..., 51-$i$-$m$, so that the amplitudes of currents which pass through the m sub-power transmission resonators 52-$i$-1, ..., 52-$i$-$m$ get close to each other. Consequently, it is possible to increase the effect of mutual cancellation of the magnetic fields.

In a case where the number of wireless power transmissions performed in parallel at the same frequency is increased, the intensities of the leaked electric fields or magnetic fields exist in the same frequency bandwidth, resulting in that the interference increases. On the contrary, according to this modified example, by controlling the phase difference of the sub-power supplies, even in the case where the number of wireless power transmissions performed in parallel at the same frequency is increased, it is possible to reduce the intensities of the leaked electric fields or magnetic fields.

As described above, in the modified example, the power transmission device 6 further includes the phase controllers which control the phases of AC powers output by the plurality of sub-power supplies so that the electromagnetic fields leaked from the plurality of sub-power transmission resonators are mutually cancelled.

Consequently, even in a case where the number of parallel transmissions is increased within a limited frequency range to increase the amount of transmission power, by making the leaked electromagnetic fields cancel each other, it is possible to reduce the intensities of the leaked electric fields or magnetic fields.

Note that in the first to fourth embodiments, it is set that the pair of power transmission resonators whose resonance frequencies are adjacent to each other on the frequency axis, out of the plurality of power transmission resonators, satisfies the following operating band condition, but, the embodiments are not limited to this. Here, the operating band condition indicates that the operating band of the first power transmission resonator includes the frequency of the first power supply and does not include the frequency of the second power supply, and the operating band of the second power transmission resonator does not include the frequency of the first power supply and includes the frequency of the second power supply.

It is also possible to design such that the pair of power transmission resonators whose resonance frequencies are not adjacent to each other on the frequency axis, out of the plurality of power transmission resonators, satisfies this operating band condition. Note that it is set that in the above-described operating band condition, one of the power transmission resonators whose resonance frequencies are not adjacent to each other is replaced with the first power transmission resonator, and the other power transmission resonator is replaced with the second power transmission resonator.

Accordingly, the magnetic-field-coupling does not occur between the power transmission resonators which satisfy this operating band condition, so that when performing the wireless power transmission to the plurality of power reception resonators using the magnetic field resonance system, the transmission efficiency with respect to the power reception device can be improved.

Fifth Embodiment

Next, a fifth embodiment will be described. In the second embodiment, the power transmission resonator and the power supply are connected in one-to-one relation. On the contrary, in the fifth embodiment, a power transmission resonator is used in a shared manner, and one power transmission resonator is connected to a plurality of power supplies.

Figure 17:
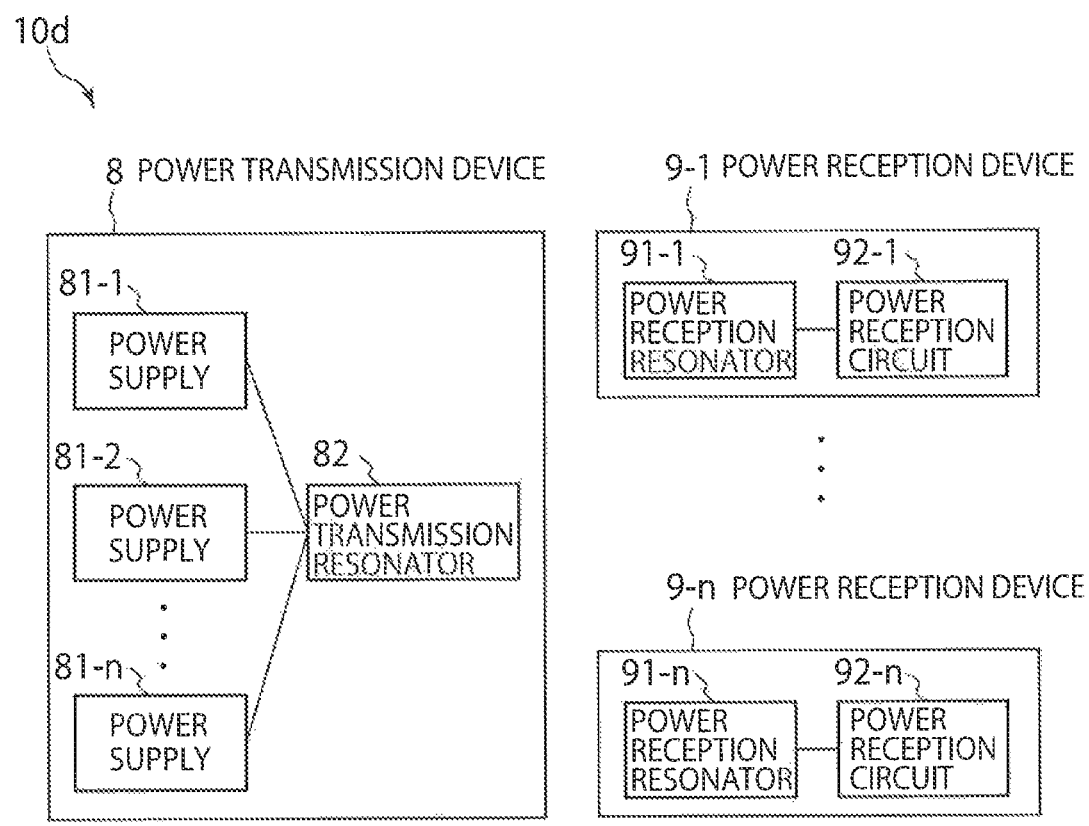
FIG. 17 is a diagram illustrating a configuration of a power transmission system 10d in a fifth embodiment.

FIG. 17 is a diagram illustrating a configuration of a power transmission system 10d in the fifth embodiment. As illustrated in FIG. 17, the power transmission system 10d includes a power transmission device 8, and n power reception devices 9-i of power reception devices 9-1, . . . , up to 9-n.

The power transmission device 8 includes n power supplies 81-i of power supplies 81-1, 81-2, . . . , up to 81-n, and a power transmission resonator 82 connected to the respective power supplies 81-i.

The power supplies 81-1, 81-2, . . . , 81-n output AC powers having mutually different frequencies to the power transmission resonator 82.

The power transmission resonator 82 resonates by using the powers supplied from the power supplies 81-1, 81-2, . . . , 81-n. An operating band of the power transmission resonator 82 includes all frequencies of the power supplies 81-1, 81-2, . . . , 81-n. Consequently, the power transmission resonator 82 can resonate at any one of the frequencies of the power supplies 81-1, 81-2, . . . , 81-n.

Each of the power reception devices 9-i includes a power reception resonator 91-i, and a power reception circuit 92-i connected to the power reception resonator 91-i.

Each of the power reception resonators 91-i wirelessly receives power from the power transmission resonator 82 through the magnetic field resonance. Further, the respective power reception resonators 91-i have mutually different resonance frequencies.

Each of the power reception circuits 92-i receives power from the power reception resonator 91-i connected thereto.

Figure 18:
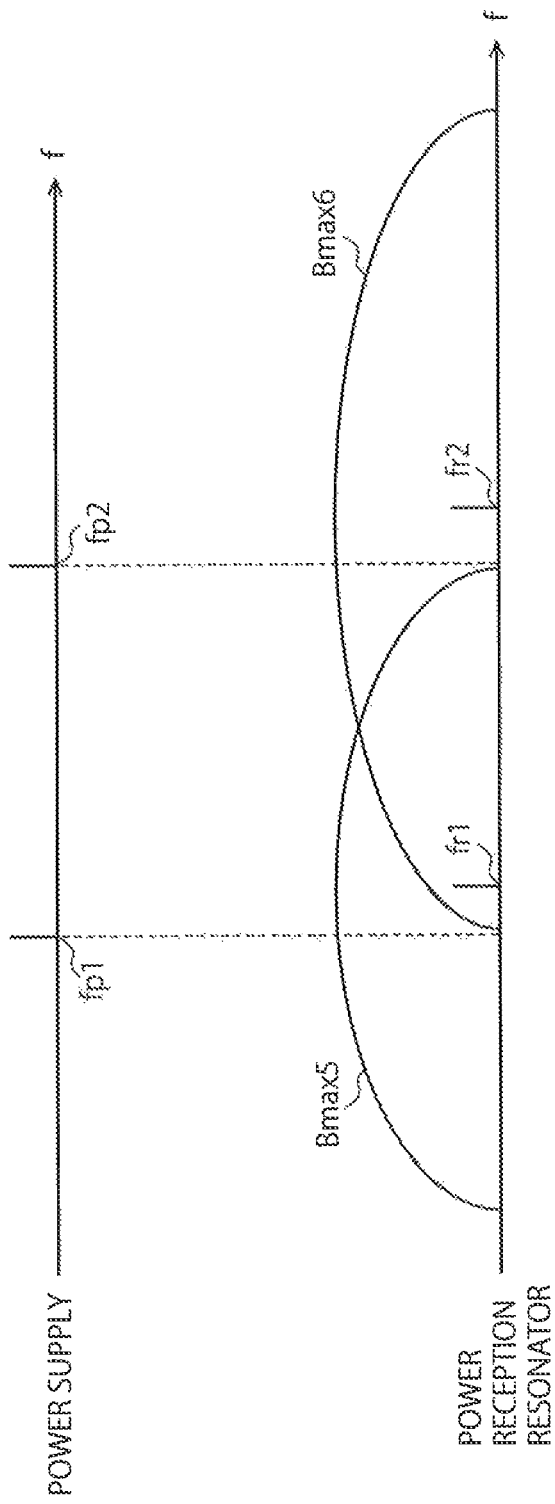
FIG. 18 is a diagram illustrating an example of relation between operating bands of power reception resonators whose resonance frequencies are adjacent to each other on the frequency axis, and frequencies of power supplies corresponding to the power reception resonators.

Next, relation between operating bands of power reception resonators whose resonance frequencies are adjacent to each other on the frequency axis, and frequencies of power supplies corresponding to the power reception resonators, will be described by using FIG. 18. FIG. 18 is a diagram illustrating an example of relation between operating bands of power reception resonators whose resonance frequencies are adjacent to each other on the frequency axis, and frequencies of power supplies corresponding to the power reception resonators. In the example of FIG. 18, the resonance frequency fr1 of the first power reception resonator is different from the frequency fp1 of the first power supply corresponding to the first power reception resonator, as an example. Further, the resonance frequency fr2 of the second power reception resonator is different from the frequency fp2 of the second power supply corresponding to the second power reception resonator, as an example.

Here, out of the plurality of power reception resonators 91-1 to 91-n, power reception resonators whose resonance frequencies are adjacent to each other on the frequency axis are referred to as the first power reception resonator and the second power reception resonator. Further, all pairs each consisting of the first power reception resonator and the second power reception resonator satisfy the following operating band condition of the power reception resonators.

As indicated by a maximum band Bmax5 capable of being obtained by the first power reception resonator in FIG. 18, an operating band of the first power reception resonator includes the frequency fp1 of the first power supply, the frequency being a frequency closest to the resonance frequency of the first power reception resonator, out of the plurality of power supplies 81-1 to 81-n, and does not include the frequency fp2 of the second power supply, out of the plurality of power supplies 81-1 to 81-n, the frequency being adjacent to the frequency fp1 of the first power supply on the frequency axis.

Further, as indicated by a maximum band Bmax6 capable of being obtained by the second power reception resonator in FIG. 18, an operating band of the second power reception resonator does not include the frequency fp1 of the first power supply, and Includes the frequency fp2 of the second power supply.

By setting as described above, the frequency fp2 of the second power supply is out of the operating band of the first power reception resonator. Specifically, the first power reception resonator is not magnetic-field-coupled to the second power reception resonator which resonates at the frequency fp2 of the second power supply. In a similar manner, the frequency fp1 of the first power supply is out of the operating band of the second power reception resonator. Specifically, the second power reception resonator is not magnetic-field-coupled to the first power reception resonator which resonates at the frequency fp1 of the first power supply. Therefore, since the magnetic-field-coupling does not occur among the power reception resonators 91-1 to 91-n, it is possible to prevent deterioration of characteristics of the power reception resonators 91-1 to 91-n. As a result of this, the transmission efficiency between the power transmission resonator 82 and the power reception resonators 91-1 to 91-n can be improved.

As described above, in the fifth embodiment, the power transmission system 10d includes the plurality of power supplies 81-1 to 81-n which output the AC powers having mutually different frequencies, the power transmission resonator 82 connected to the plurality of power supplies 81-1 to 81-n, and the plurality of power reception resonators 91-1 to 91-n wirelessly receiving power from the power transmission resonator 82 through the magnetic field resonance, and having mutually different resonance frequencies. Further, when the power reception resonators whose resonance frequencies are adjacent to each other on the frequency axis, out of the plurality of power reception resonators 91-1 to 91-n, are set to the first power reception resonator and the second power reception resonator, the operating band of the first power reception resonator includes the frequency of the first power supply having the frequency closest to the resonance frequency of the first power reception resonator out of the plurality of power supplies 81-1 to 81-n, and does not include the frequency of the second power supply, the frequency being adjacent to the frequency of the first power supply on the frequency axis, out of the plurality of power supplies 81-1 to 81-n. Further, the operating band of the second power reception resonator does not include the frequency of the first power supply, and Includes the frequency of the second power supply.

Consequently, since the magnetic-field-coupling does not occur among the power reception resonators 91-1, . . . , 91-$n$, it is possible to prevent deterioration of characteristics of the power reception resonators 91-1 to 91-$n$. As a result of this, the transmission efficiency between the power transmission resonator 82 and the power reception resonators 91-1 to 91-$n$ can be improved.

In the fifth embodiment, when compared to the respective power transmission resonators in the second embodiment, the current which passes through the power transmission resonator 82 in the present embodiment increases, so that a temperature rise in the power transmission resonator 82 increases. Further, when compared to the second embodiment, a physical distance between the power transmission resonator and the power reception resonators is increased, so that the transmission efficiency is lowered. However, since it is possible to reduce the number of power transmission resonators, when compared to the second embodiment, it is possible to reduce a cost of the power transmission device 8. Therefore, the power transmission system 10$d$ in the fifth embodiment is effective when it is applied to an application in which the temperature rise and the reduction in transmission efficiency do not much matter.

Note that in the fifth embodiment, all of the pairs each consisting of the first power reception resonator and the second power reception resonator satisfy the above-described operating band condition of the power reception resonators, but, the embodiment is not limited to this. It is also possible that at least one or more pairs each consisting of the first power reception resonator and the second power reception resonator satisfy the above-described operating band condition of the power reception resonators.

Note that the resonance frequency of each of the power reception resonators 91-1 to 91-$n$ may also be equal to any one of the frequencies of the plurality of power supplies 81-1 to 81-$n$. In that case, the difference between the frequency of the first power supply described above and the frequency of the second power supply described above may also be set to be greater than one-half the operating bandwidth of the first power reception resonator described above, and greater than one-half the operating bandwidth of the second power reception resonator described above. Consequently, since the magnetic-field-coupling does not occur among the power reception resonators 91-1 to 91-$n$, it is possible to prevent deterioration of characteristics of the power reception resonators 91-1 to 91-$n$. As a result of this, the transmission efficiency between the power transmission resonator 82 and the power reception resonators 91-1 to 91-$n$ can be improved.

Note that in the fifth embodiment, it is set that the above-described operating band condition of the power reception resonators is satisfied regarding the pair of power supplies whose frequencies are adjacent to each other, but, the embodiment is not limited to this. It is also possible to set that the aforementioned operating band condition of the power reception resonators is satisfied regarding the pair of power supplies whose frequencies are not adjacent to each other. Accordingly, since the magnetic-field-coupling does not occur between the power reception resonators satisfying this condition, when performing the wireless power transmission to the plurality of power reception resonators using the magnetic field resonance system, the transmission efficiency with respect to the power reception device can be improved.

Further, although each of the embodiments describes the example of performing the power transmission in a wireless manner by using the magnetic field resonance system, it is not limited to this. Each of the embodiments is similarly applicable to a case where power transmission is performed in a wireless manner by using another method such as electric field resonance, for example.

It should be noted that the present invention is not limited to the above-described embodiments as they are, but may be embodied with components being modified in a range not departing from the contents thereof at the stage of implementation. Further, various inventions can be formed by appropriately combining a plurality of components disclosed in the above-described embodiments. For example, some of all the components shown in the embodiments may be deleted. Further, components ranging across different embodiments can be combined appropriately.

The invention claimed is:

1. A power transmission device, comprising:
a first power transmission resonator having a first resonance frequency and a first operating frequency band;
a second power transmission resonator having a second resonance frequency and a second operating frequency band, wherein the first power transmission resonator and the second power transmission resonator are configured to wirelessly transmit power, a gap of the first resonance frequency and the second resonance frequency is bigger than a half of the first operating frequency band; and the gap of the first resonance frequency and the second resonance frequency is bigger than a half of the second operating frequency band;
a first power supply coupled to the first power transmission resonator and configured to output a first AC power to the first power transmission resonator; and
a second power supply coupled to the second power transmission resonator and configured to output a second AC power having a frequency different from a frequency of the first AC power to the second power transmission resonator, wherein:
the first operating frequency band includes the first resonance frequency and does not include the second resonance frequency;
the second operating frequency band does not include the first resonance frequency and includes the second resonance frequency; and
the first operating frequency band is partially overlapped with the second operating frequency band.

2. The power transmission device according to claim 1, comprising three or more power transmission resonators including the first power transmission resonator and the second power transmission resonator, wherein when resonance frequencies of the three or more power transmission resonators are ordered in frequency, the first resonance frequency and the second resonance frequency are adjacent to each other.

3. The power transmission device according to claim 1, wherein:
the first resonance frequency is equal to the frequency of the first AC power; and
the second resonance frequency is equal to the frequency of the second AC power.

4. The power transmission device according to claim 3, wherein:
the first operating frequency band has a value obtained by dividing the first resonance frequency by a Q value of the first power transmission resonator; and the second operating frequency band has a value obtained by dividing the second resonance frequency by a Q value of the second power transmission resonator.

5. The power transmission device according to claim 1, wherein if a lower frequency out of the frequencies of the first AC power and the second AC power is within a frequency band to be set for interference noise measurement, a frequency difference between the first AC power and the second AC power is set to be greater than a measurement frequency bandwidth which is set in accordance with the frequency band.

6. The power transmission device according to claim 1, wherein the first power supply comprises a plurality of sub-power supplies and the sub-power supplies have mutually the same frequency;
the second power supply comprises a plurality of sub-power supplies and the sub-power supplies have mutually the same frequency;
each of the first power transmission resonator and the second power transmission resonator comprises a plurality of sub-power transmission resonators connected to different ones of the plurality of sub-power supplies;
the sub-power transmission resonators of the first power transmission resonator wirelessly send power to each of a plurality of sub-power reception resonators of a first power reception resonator of a power reception device; and
the sub-power transmission resonators of the second power transmission resonator wirelessly send power to each of a plurality of sub-power reception resonators of a second power reception resonator of the same power reception device.

7. The power transmission device according to claim 6, further comprising:
a first phase controller configured to control phases of AC powers output by the plurality of sub-power supplies of the first power supply to make electromagnetic fields leaked from the plurality of sub-power transmission resonators of the first power supply cancel each other; and
a second phase controller configured to control phases of AC powers output by the plurality of sub-power supplies of the second power supply to make electromagnetic fields leaked from the plurality of sub-power transmission resonators of the second power supply cancel each other.

8. The power transmission device according to claim 7, wherein the first and second phase controllers control amplitudes of the AC powers output by the plurality of sub-power supplies to make amplitudes of currents which pass through the plurality of sub-power transmission resonators get close to each other.

9. The power transmission device according to claim 1, wherein: the first resonance frequency and the second resonance frequency are adjacent to each other on a frequency axis.

10. The power transmission device according to claim 1, wherein:
the first power transmission resonator includes a capacitor and an inductor; and
the second power transmission resonator includes a capacitor and an inductor.

* * * * *